(12) United States Patent
Park et al.

(10) Patent No.: US 10,500,894 B2
(45) Date of Patent: Dec. 10, 2019

(54) ROBOT CLEANER

(71) Applicant: SAMSUNG ELECTRONICS CO., LTD., Suwon-si, Gyeonggi-do (KR)

(72) Inventors: Chan-young Park, Suwon-si (KR); Seung-il Han, Incheon (KR); Jun-won Seo, Hwaseong-si (KR); Kyu-ha Lee, Yongin-si (KR); Young-mi Kim, Suwon-si (KR); Hyun-uk Park, Suwon-si (KR); Jea-won Lee, Hwaseong-si (KR); Young-kyun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 15/363,292

(22) Filed: Nov. 29, 2016

(65) Prior Publication Data

US 2017/0181592 A1    Jun. 29, 2017

(30) Foreign Application Priority Data

Dec. 23, 2015   (KR) .................. 10-2015-0184481

(51) Int. Cl.
*B60B 3/02* (2006.01)
*A47L 9/00* (2006.01)
*B60B 3/00* (2006.01)
*B60B 3/10* (2006.01)
*B60B 19/00* (2006.01)

(52) U.S. Cl.
CPC ............. *B60B 3/02* (2013.01); *A47L 9/009* (2013.01); *B60B 3/001* (2013.01); *B60B 3/10* (2013.01); *B60B 19/00* (2013.01); *A47L 2201/00* (2013.01)

(58) Field of Classification Search
CPC .. B60B 3/02; B60B 19/00; B60B 3/10; B60B 3/001; A47L 9/009; A47L 2201/00
See application file for complete search history.

(56) References Cited

U.S. PATENT DOCUMENTS

| 4,832,098 A | 5/1989 | Palinkas et al. |
| 6,615,885 B1 * | 9/2003 | Ohm .................. B60B 9/26 152/11 |

(Continued)

FOREIGN PATENT DOCUMENTS

| DE | 102007036225 | 2/2009 |
| DE | 102008009617 | 8/2009 |

(Continued)

OTHER PUBLICATIONS

Extended European Search Report dated Aug. 24, 2018 in European Patent Application No. 16879213.3.

(Continued)

*Primary Examiner* — David Redding
(74) *Attorney, Agent, or Firm* — Staas & Halsey LLP

(57) ABSTRACT

A wheel for a robot cleaner includes an outer ring in contact with a surface to be cleaned, an inner ring which is disposed inside the outer ring and receives a driving force, a plurality of spokes which connect the outer ring and the inner ring, and form a plurality of independent spaces through which air passes, and a plurality of ribs disposed in the plurality of independent spaces, each of the plurality of ribs having a shorter length than a length of each of the plurality of spokes.

19 Claims, 31 Drawing Sheets

(56) References Cited

U.S. PATENT DOCUMENTS

| | | | |
|---|---|---|---|
| 8,714,220 B2* | 5/2014 | Tso | F16H 55/171 |
| | | | 152/375 |
| D711,815 S | 8/2014 | Abe et al. | |
| 8,883,283 B2 | 11/2014 | Delfino et al. | |
| 9,381,442 B2 | 7/2016 | Barse | |
| 2007/0267116 A1 | 11/2007 | Rhyne et al. | |
| 2012/0193969 A1 | 8/2012 | Tso et al. | |
| 2013/0240272 A1 | 9/2013 | Gass et al. | |
| 2015/0107037 A1 | 4/2015 | Gilbert, Jr. et al. | |
| 2015/0111462 A1 | 4/2015 | Barse | |
| 2015/0122382 A1 | 5/2015 | Choi et al. | |
| 2016/0288571 A1 | 10/2016 | Dotson et al. | |

FOREIGN PATENT DOCUMENTS

| | | |
|---|---|---|
| DE | 202011050101 | 9/2011 |
| JP | 2010-58556 | 3/2010 |
| JP | 2015-77410 | 4/2015 |
| KR | 10-0967531 | 7/2010 |
| KR | 10-1301578 | 8/2013 |
| KR | 10-2013-0108445 | 10/2013 |
| KR | 10-1378436 | 3/2014 |
| KR | 10-1411103 | 6/2014 |
| KR | 10-2014-0125166 | 10/2014 |
| KR | 10-2015-0012611 | 2/2015 |

OTHER PUBLICATIONS

International Search Report and Written Opinion of the International Searching Authority dated Mar. 13, 2017 from International Patent Application No. PCT/KR2016/014137, 11 pages.

\* cited by examiner

70

80

ROBOT CLEANER

CROSS-REFERENCE TO RELATED APPLICATIONS

This application claims the priority benefit of Korean Patent Application No. 10-2015-0184481 filed Dec. 23, 2015, in the Korean Intellectual Property Office, the disclosure of which is incorporated herein by reference in its entirety.

BACKGROUND

1. Field

The disclosure relates to a robot cleaner. More particularly, the disclosure relates to a robot cleaner provided with a wheel with spokes.

2. Description of the Related Art

Generally, a robot cleaner is configured to clean while moving on a surface to be cleaned using wheels.

FIG. 1 illustrates a conventional wheel 200 used in the robot cleaner.

Referring to FIG. 1, the conventional wheel 200 for the robot cleaner consists of a hub 210 and a tire 220.

The hub 210 is formed of a rigid body, and the tire 220 is formed of an elastic material. For example, the tire 220 is formed in a substantially donut shape an inside of which is filled, and is formed of a rubber.

As another example, a tire 220 configured in a structure having an outer shell that is formed in the donut shape and of an elastic material such as rubber and air that is injected into the outer shell as a typical automobile wheel is used.

The hub 210 is coupled to a drive shaft (not illustrated), and the tire 220 is coupled integrally with the outer circumferential surface of the hub 210. Accordingly, when the drive shaft rotates, the hub is rotated. Thus, the tire 220 is rotated integrally with the hub 210 so that the robot cleaner is moved.

However, when the robot cleaner with the conventional wheels overpasses an obstacle, if the height of the obstacle exceeds more than a predetermined height, the robot cleaner does not overpass the obstacle and slides. Then, the robot cleaner does not travel more, and stops its operation.

This occurs due to a small contact area between the wheel of the robot cleaner and the obstacle. Accordingly, in order to improve the obstacle climbing ability of the robot cleaner, development of a wheel which can widen a contact area between the wheel and an obstacle is required.

SUMMARY

Additional aspects and/or advantages will be set forth in part in the description which follows and, in part, will be apparent from the description, or may be learned by practice of the disclosure.

The disclosure has been developed in order to overcome the above drawbacks and other problems associated with the conventional arrangement. An aspect of the disclosure relates to a robot cleaner provided with a wheel having an improved obstacle climbing ability.

According to an aspect of the disclosure, a robot cleaner may include a wheel which may include an outer ring in contact with a surface to be cleaned, an inner ring which is disposed inside the outer ring and receives a driving force, a plurality of spokes which connect the outer ring and the inner ring, and form a plurality of independent spaces through which air passes, and a plurality of ribs disposed in the plurality of independent spaces, each of the plurality of ribs that is shorter than a length of each of the plurality of spokes.

When the outer ring is moved toward the inner ring, the plurality of ribs may limit movement of the outer ring.

The wheel may include a supporting piece that is provided in each of the plurality of independent spaces, and supports each of the plurality of ribs with respect to adjacent spokes.

A thickness of the supporting piece may be thinner than a thickness of each of the plurality of ribs, and a length of the supporting piece may be shorter than a length of each of the plurality of ribs.

The plurality of ribs may be formed in the inner ring.

A width of each of the plurality of ribs may be narrower than a width of each of the plurality of spokes.

Each of the plurality of spokes may be formed in a curved surface bent in a circumferential direction of the inner ring.

Each of the plurality of ribs may be formed in a curved surface bent in the same direction of the plurality of spokes.

The wheel may include a first wheel and a second wheel that are disposed parallel to each other, and a bending direction of a plurality of spokes of the first wheel may be the same as a bending direction of a plurality of spokes of the second wheel.

The first wheel and the second wheel may be disposed so that when each of the plurality of spokes is adjacent to the surface to be cleaned, a recessed portion of the each of the plurality of spokes is directed toward a front surface of the robot cleaner.

Each of the plurality of ribs may be spaced apart from two adjacent spokes.

Each of the plurality of ribs may be disposed in a middle between the two adjacent spokes.

At least one of a width of one end of the spoke connected to the inner ring and a width of an opposite end of the spoke connected to an inner surface of the outer ring may be wider than a width of a middle portion of the spoke.

The inner ring may be fixed to a hub formed of a rigid body.

An outer surface of the outer ring may be provided with a plurality of protrusions.

The outer ring, the inner ring, the plurality of spokes, and the plurality of ribs may be formed of an injection rubber or a vulcanized rubber.

According to an aspect of the disclosure, a robot cleaner may include a wheel which may include an outer ring in contact with a surface to be cleaned, an inner ring which is disposed inside the outer ring and receives a driving force, a plurality of spokes which connect the outer ring and the inner ring, and form a plurality of independent spaces through which air passes, and a plurality of ribs disposed in the plurality of independent spaces to limit movement of the outer ring when the outer ring is moved toward the inner ring.

The plurality of ribs may be provided in the inner ring, and a length of each of the plurality of ribs may be shorter than a length of each of the plurality of spokes.

Other objects, advantages and salient features of the disclosure will become apparent from the following detailed description, which, taken in conjunction with the annexed drawings, discloses preferred embodiments.

BRIEF DESCRIPTION OF THE DRAWINGS

These and/or other aspects and advantages of the disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Figure 1:
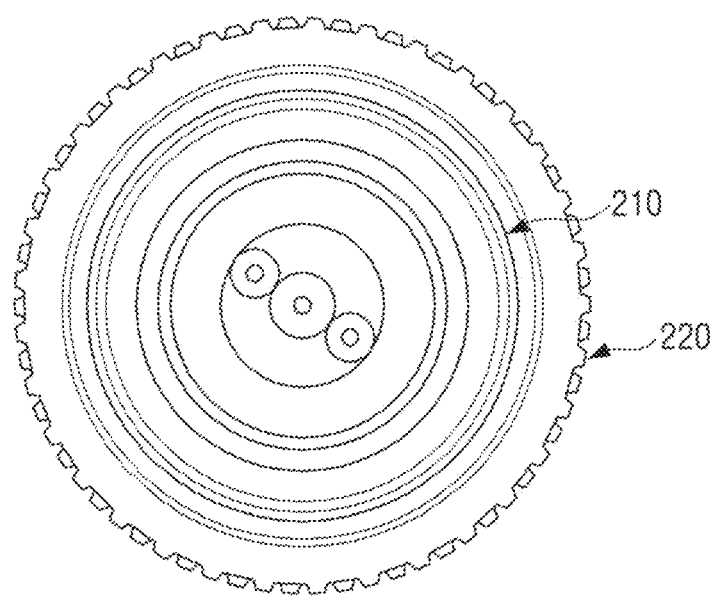
FIG. 1 is a view illustrating a conventional wheel for a robot cleaner.

Reference will now be made in detail to example embodiments which are illustrated in the accompanying drawings, wherein like reference numerals refer to like elements throughout. The embodiments are described below to explain the disclosure by referring to the figures.

Hereinafter, certain exemplary embodiments of the disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms "first", "second", etc. may be used to describe diverse components, but the components are not limited by the terms. The terms are only used to distinguish one component from the others.

The terms used in the application are only used to describe the exemplary embodiments, but are not intended to limit the scope of the disclosure. The singular expression also includes the plural meaning as long as it does not differently mean in the context. In the application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

It is to be understood that the singular forms "a," "an," and "the" include plural referents unless the context clearly dictates otherwise. Thus, for example, reference to "a component surface" includes reference to one or more of such surfaces.

Hereinafter, a robot cleaner according to an embodiment of the disclosure will be described with reference to FIGS. 2, 3, and 4.

Figure 2:
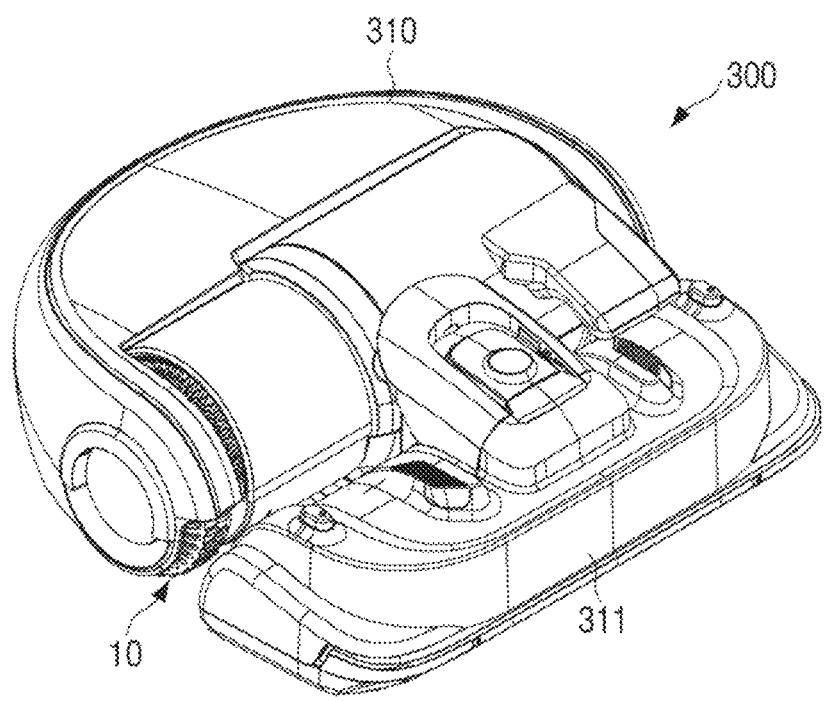
FIG. 2 is a perspective view illustrating a robot cleaner according to an embodiment of the disclosure.

FIG. 2 is a perspective view illustrating a robot cleaner according to an embodiment of the disclosure. FIG. 3 is a back perspective view illustrating the robot cleaner of FIG. 2, and FIG. 4 is a functional block diagram of the robot cleaner of FIG. 2.

Figure 3:
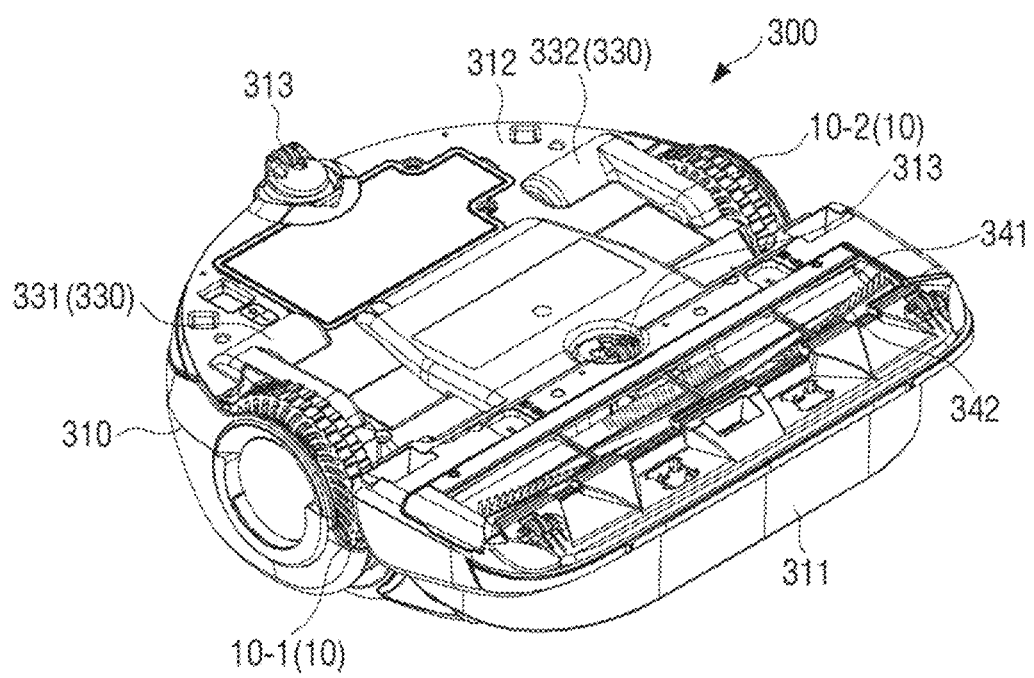
FIG. 3 is a back perspective view illustrating the robot cleaner of FIG. 2.
Figure 4:
FIG. 4 is a functional block diagram of the robot cleaner of FIG. 2.

Referring to FIGS. 2, 3, and 4, a robot cleaner 300 according to an embodiment of the disclosure may include a main body 310, a controller 320, a drive portion 330, and a cleaning device 340.

The main body 310 forms an appearance of the robot cleaner 300. The controller 320, the drive portion 330, and the cleaning device 340 are disposed inside the main body 310. Also, the inside of the main body 310 may be provided with a position detecting unit (not illustrated) capable of detecting a current position of the robot cleaner 300, an obstacle detecting unit (not illustrated) capable of detecting obstacles around the robot cleaner 300, and a power supplying unit (not illustrated) capable of supplying power to the controller 320, the drive portion 330, the position detecting unit (not illustrated), the obstacle detecting unit (not illustrated), and the like.

The drive portion 330 allows the robot cleaner 300 to move on the surface to be cleaned, and, as illustrated in FIG. 3, may include two drive units 331 and 332 and two wheels 10 which are rotatably disposed in a bottom surface 312 of the main body 310. The two wheels 10, that is, a first wheel 10-1 and a second wheel 10-2 are disposed parallel to each other. The first wheel 10-1 is disposed to be rotated by a first drive unit 331, and the second wheel 10-2 is disposed to be rotated by a second drive unit 332. In detail, the first wheel 10-1 is disposed to rotate by receiving a driving force from the first drive unit 331, and the second wheel 10-2 is disposed to rotate by receiving a driving force from the second drive unit 332. The structure of the first and second wheels 10-1 and 10-2 is described in detail below.

Each of the first and second drive units 331 and 332 includes a motor. Accordingly, the controller 320 controls the motor of each of the first and second drive units 331 and 332 of the drive portion 330 to rotate the first wheel 10-1 and the second wheel 10-2, thereby allowing the robot cleaner 300 to move.

Also, two auxiliary wheels 313 may be provided in the bottom surface 312 of the main body 310 in a direction perpendicular to the two wheels 10.

The cleaning device 340 is a device to suck dirt and dust from the surface to be cleaned, and a suction port 341 is formed on the bottom surface 312 of the main body 310. In detail, the suction port 341 may be provided in a front side of the bottom surface 312 of the main body 310. The suction port 341 may be provided with a brush 342 that is rotatably disposed to collect the dirt.

The controller 320 allows the robot cleaner 300 to move by controlling the motors of the first and second drive units 331 and 332 of the drive portion 330, and performs cleaning by sucking the dirt and dust from the surface to be cleaned by controlling the cleaning device 340.

The structure of the robot cleaner 300 as described above is the same as or similar to the conventional robot cleaner; therefore, a detailed description thereof is omitted.

Hereinafter, a wheel that is used in a robot cleaner according to an embodiment of the disclosure will be described in detail with reference to FIGS. 5, 6A, 6B, and 6C.

Figure 5:
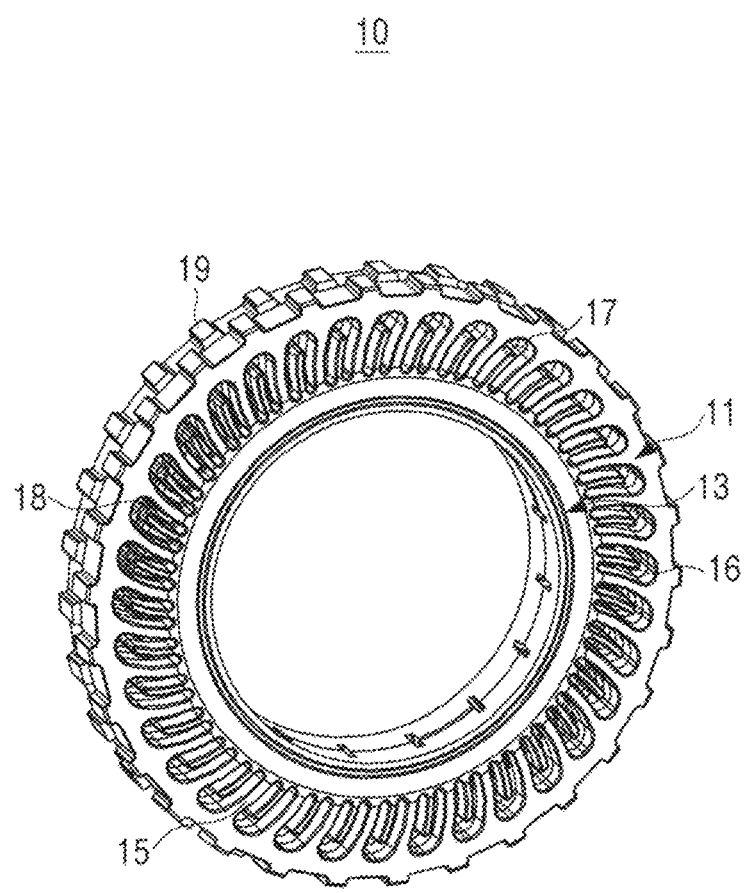
FIG. 5 is a perspective view illustrating a wheel according to a first embodiment of the disclosure that is used in a robot cleaner according to an embodiment of the disclosure.
Figure 6A:
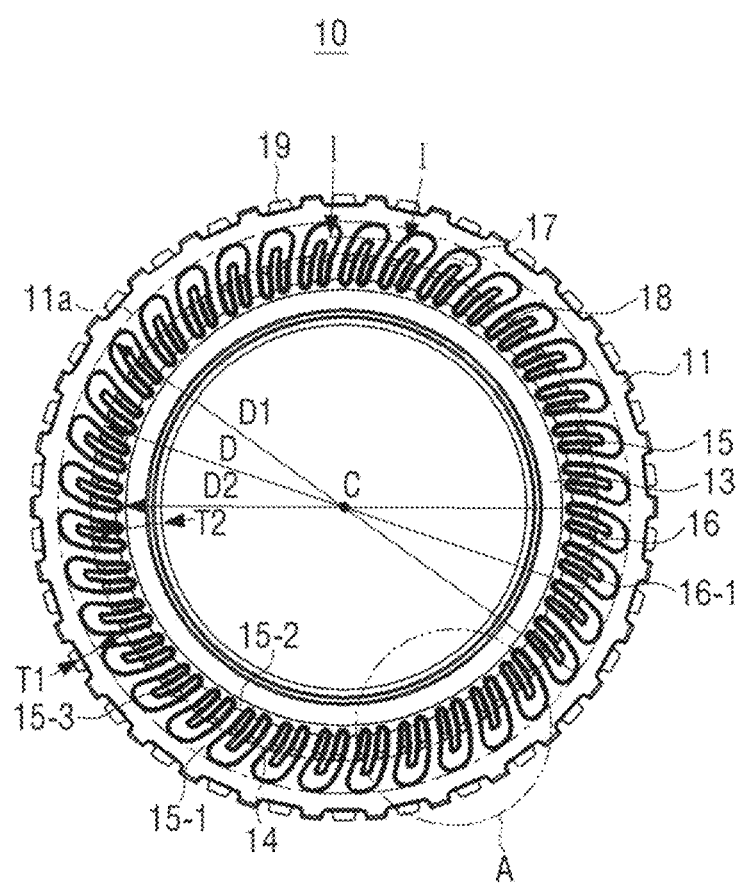
FIG. 6A is a front view illustrating the wheel of FIG. 5 according to the first embodiment of the disclosure.
Figure 6B:
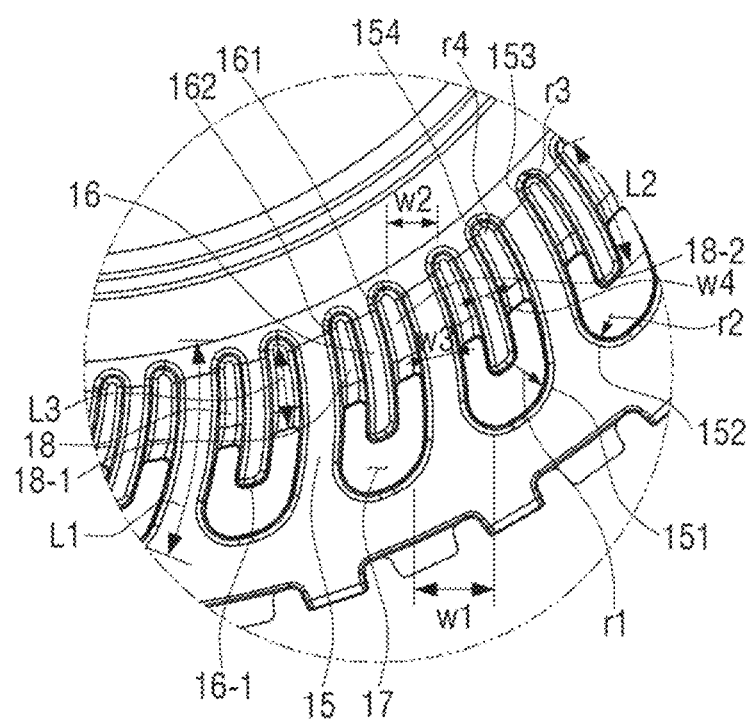
FIG. 6B is an enlarged view illustrating an A portion of the wheel of FIG. 6A.
Figure 6C:
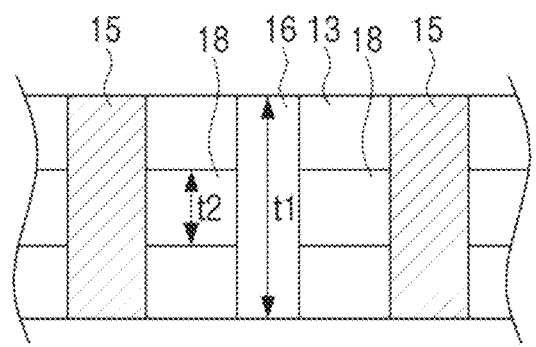
FIG. 6C is a partial cross-sectional view illustrating the wheel of FIG. 6A taken along a line I-I.

FIG. 5 is a perspective view illustrating a wheel a first embodiment of the disclosure that is used in a robot cleaner according to an embodiment of the disclosure. FIG. 6A is a front view illustrating the wheel of FIG. 5 according to the first embodiment of the disclosure, and FIG. 6B is an enlarged view illustrating an A portion of the wheel of FIG. 6A. FIG. 6C is a partial cross-sectional view illustrating the wheel of FIG. 6A taken along a line I-I.

Referring to FIGS. 5, 6A, and 6B, a wheel 10 according to a first embodiment of the disclosure may include an outer ring 11, an inner ring 13, a plurality of spokes 15, and a plurality of ribs 16.

The outer ring 11 is in contact with the surface to be cleaned, is formed in an annular shape or a ring shape, and is formed of an elastic material. The outer surface of the outer ring 11 may be provided with a shape that can prevent sliding when the outer ring 11 is in contact with the surface to be cleaned. For example, a plurality of protrusions 19 may be provided on the outer surface of the outer ring 11. The outer ring 11 is formed so that, when overpassing an obstacle, a contact portion of the outer ring 11 in contact with the obstacle is deformed corresponding to the shape of the obstacle, thereby widening a contact area with the obstacle as possible.

The inner ring 13 is positioned concentrically with the outer ring 11 inside the outer ring 11, and may be formed of an elastic material in the same manner as the outer ring 11. The inner ring 13 may be formed in an annular shape or a ring shape in the same manner as the outer ring 11. The thicknesses T2 and T1 of the inner ring 13 and the outer ring 11 may be formed equally, but in an embodiment as illustrated in FIG. 6A, the thickness T1 of the outer ring 11 is formed to be thinner than the thickness T2 of the inner ring 13.

Figure 7A:
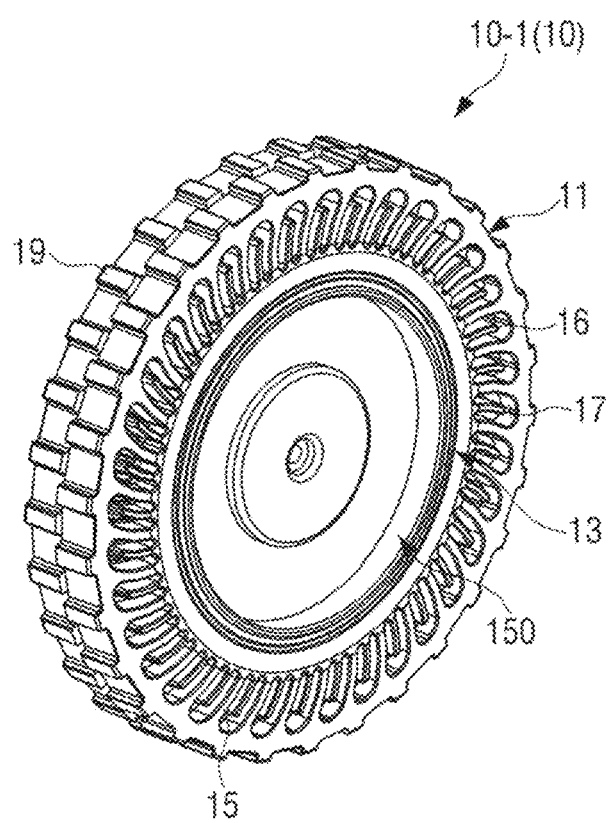
FIG. 7A is a perspective view illustrating a wheel according to a first embodiment of the disclosure that will be disposed in a side of a robot cleaner.
Figure 7B:
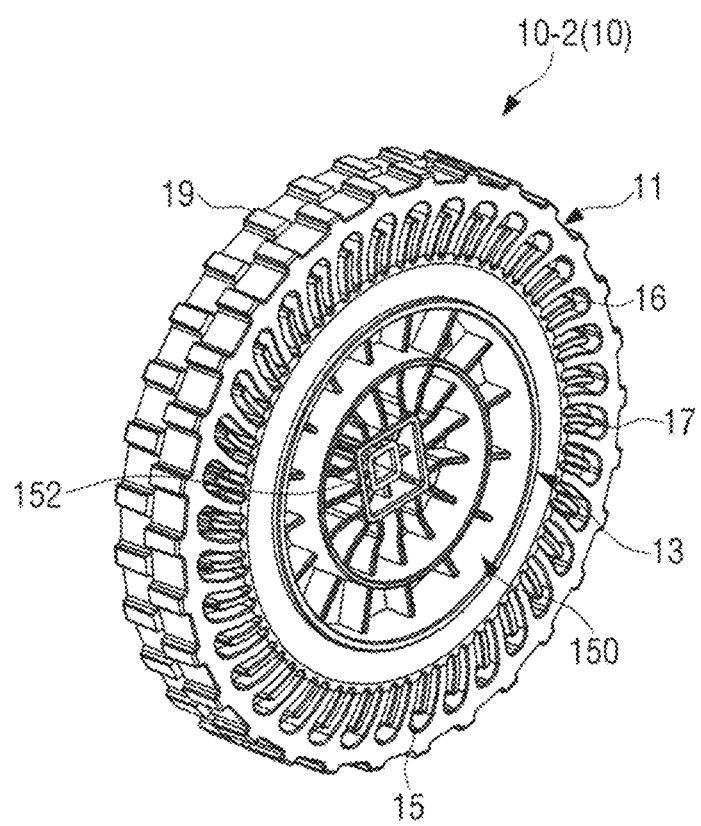
FIG. 7B is a perspective view illustrating a wheel according to a first embodiment of the disclosure that will be disposed in the other side of a robot cleaner.

The inside of the inner ring 13 is provided with a hub 150 as illustrated in FIGS. 7A and 7B. The hub 150 is formed of a rigid body, and is formed in a substantially cylindrical shape. The inner ring 13 is fixed to the hub 150 so that when the hub 150 rotates, the inner ring 13 is not separated from the hub 150. The center of the hub 150 may be provided with a shaft hole 152 to which a rotational shaft 333 and 334 (see FIG. 8) of each of the first and second drive units 331 and 332 of the drive portion 330 is connected. When the rotational shaft 333 and 334 is connected to the shaft hole 152 of the hub 150, as the rotational shaft 333 and 334 rotates, the hub 150 and the inner ring 13 are rotated integrally. Accordingly, the inner ring 13 receives the driving force from the drive portion 330 of the robot cleaner 300 via the rotational shaft 333 and 334 and the hub 150.

The plurality of spokes 15 form a plurality of independent spaces 17 between the outer ring 11 and the inner ring 13 by connecting the outer ring 11 and the inner ring 13, support the outer ring 11, and have a function to absorb deformation of the outer ring 11. For example, when a force is applied to a certain portion of the outer ring 11 and the portion of the outer ring 11 to which the force is applied is deformed, at least one spoke supporting the portion of the outer ring 11 to which the force is applied is deformed to absorb the deformation of the outer ring 11, and then allows the outer ring 11 to be restored in an original state when the force is removed. The plurality of spokes 15 to perform this function are formed of an elastic material, and may be provided between the outer ring 11 and the inner ring 13 in a variety of forms and arrangement. Also, the plurality of independent spaces 17 formed by the outer ring 11, the inner ring 13, and the plurality of spokes 15 form through holes that penetrate the wheel 10 in the lateral direction. Accordingly, outside air may pass through the plurality of independent spaces 17, thereby moving from one side of the wheel 10 to the other side of the wheel 10.

In the embodiment as illustrated in FIGS. 5, 6A, and 6B, each of the plurality of spokes 15 is formed in a predetermined curved surface to connect the inner ring 13 and the outer ring 11. Also, the plurality of spokes 15 are arranged by regular intervals in the circumferential direction of the inner ring 13 between the inner ring 13 and the outer ring 11, thereby forming the plurality of independent spaces 17. In detail, each of the plurality of spokes 15 is formed to be bent in the circumferential direction of the inner ring 13. In other words, each of the spokes 15 may be formed in a curved plate having a certain curvature radius.

For example, each of the spokes 15 may be formed so that a center of curvature of the spoke 15 is positioned on the circumference of an imaginary circle 14 which is positioned concentrically with the inner ring 13 and has a diameter smaller than a diameter D1 of the inner surface 11a of the outer ring 11. Also, the imaginary circle 14 formed by the curvature centers of the spokes 15 may be formed to have a diameter larger than a diameter D2 of the outer surface of the inner ring 13. In other words, the curvature centers of the plurality of spokes 15 may form a single circle, and the diameter D of the circle may be smaller than the diameter D1 of the inner surface 11a of the outer ring 11 and may be larger than the diameter D2 of the outer surface of the inner ring 13. Hereinafter, the imaginary circle 14 in which the curvature centers of the plurality of spokes 15 are positioned is referred to as a curvature center circle.

For example, the diameter of the curvature center circle 14 may be determined in the following range.

0.5D1≤D≤0.9D1

Here, D1 represents the diameter of the inner surface 11a of the outer ring 11, and D represents the diameter of the curvature center circle 14.

Also, the curvature radius R of each of the plurality of spokes 15 may be determined to have a predetermined relationship with the diameter D of the curvature center circle 14. For example, the curvature radius R of the spoke 15 may be determined as follows.

0.15D≤R≤0.8D

Here, D represents the diameter of the curvature center circle 14, and R represents the curvature radius R of the spoke 15.

For example, when the diameter D1 of the inner surface 11a of the outer ring 11 of the wheel 10 with spokes is 105 mm, and the diameter D2 of the outer surface of the inner ring 13 is 70 mm, the diameter D of the curvature center circle 14 of the plurality of spokes 15 may be determined in the following range.

52.5 mmm≤D≤94.5 mm

When the diameter D of the curvature center circle 14 of the plurality of spokes 15 is 73.5 mm, the curvature radius R of the spokes 15 may be determined in the following range.

11 mm≤R≤58.8 mm

In the embodiment, the curvature radius R of the spokes 15 is about 20 mm.

The spoke 15 is formed in an elastic curved plate. Referring to FIG. 6B, a first end 15-1 of the elastic curved plate 15 is connected to the inner surface 11a of the outer ring 11, and a second end 15-2 of the elastic curved plate 15 is connected to the outer surface of the inner ring 13.

A width w1 of the first end 15-1 of the elastic curved plate 15 connected to the outer ring 11 is formed to be wider than the width w3 of the middle portion 15-3 of the elastic curved plate 15. Also, a width w2 of the second end 15-2 of the elastic curved plate 15 connected to the outer surface of the inner ring 13 is formed to be wider than the width w3 of the middle portion 15-3 of the elastic curved plate 15. At this time, the widths w1 and w2 of the opposite ends of the elastic curved plate 15 may be formed to be the same as or different from each other. In the embodiment, the width w1 of the first end 15-1 of the elastic curved plate 15 connected to the outer ring 11 is formed to be thicker than the width w2 of the second end 15-2 of the elastic curved plate 15 connected to the inner ring 13.

Connecting portions 151 and 152 between opposite side surfaces of the first end 15-1 of the elastic curved plate 15 and the inner surface of the outer ring 11 may be formed in a curved surface having a certain curvature. At this time, a first connecting portion 151 connecting a side surface of the elastic curved plate 15 and the inner surface of the outer ring 11 is formed to have a curvature radius r1 lager than a curvature radius r2 of a second connecting portion 152 connecting the opposite side surface of the elastic curved plate 15 and the inner surface of the outer ring 11.

Further, connecting portions 153 and 154 between opposite side surfaces of the second end 15-2 of the elastic curved plate 15 and the outer surface of the inner ring 13 may be formed in a curved surface having a certain curvature. At this time, a third connecting portion 153 connecting the side surface of the elastic curved plate 15 and the outer surface of the inner ring 13 is formed to have a curvature radius r3 smaller than a curvature radius r4 of a fourth connecting portion 154 connecting the opposite side surface of the elastic curved plate 15 and the outer surface of the inner ring 13.

The plurality of ribs 16 are formed in the plurality of independent spaces 17, and project from the outer surface of the inner ring 13 toward the outer ring 11, respectively. In detail, each of the plurality of ribs 16 extends between the spokes 15 from the outer surface of the inner ring 13, and is formed in a curved plate shape having the same curvature as that of each of the plurality of spokes 15. A single independent space 17 is provided with a single rib 16. When the outer ring 11 is moved toward the inner ring 13 by the force applied to the outer ring 11, the plurality of ribs 16 may limit the movement of the outer ring 11. Accordingly, when the outer ring 11 is deformed by the obstacle on the surface to be cleaned, the plurality of ribs 16 may suppress the deformation of the outer ring 11 with the plurality of spokes 15.

Also, each of the plurality of ribs 16 is disposed in the middle between two adjacent spokes 15 among the plurality of spokes 15, and is spaced apart from the two adjacent spokes 15. At this time, for injection production of the wheel 10, a spacing between the rib 16 and the spoke 15 may be about 1 mm or more.

Further, a width w4 of each of the plurality of ribs 16 may be formed to be narrower than the width of the spoke 15, in detail, the width w3 of the middle portion 15-3 of the spokes 15.

Also, each of the plurality of ribs 16 is formed to be spaced apart from the outer ring 11. In other words, a leading end 16-1 of each of the plurality of ribs 16 is not formed to be connected to the inner surface 11a of the outer ring 11. Accordingly, the length L2 of the rib 16 is shorter than the length L1 of the spoke 15.

The length of each of the plurality of ribs 16 may be determined to satisfy the following condition.

$$\frac{L1}{3} \leq L2 \leq 0.9\ L1$$

Here, L1 presents the length of the spoke 15, and L2 represents the length of the rib 16.

For example, if an end of the rib 16 connected to the inner ring 13 is referred to as a first end and an end 16-1 of the rib 16 which extends from the first end and is positioned in the independent space 17 between two adjacent spokes 15 is referred to as a second end, the second end 16-1 of each of the plurality of ribs 16 may be formed to be positioned between the inner surface 11a of the outer ring 11 and the imaginary circle 14 in which the curvature centers of the plurality of spokes 15 are located, that is, the curvature center circle 14.

In the embodiment as illustrated in FIG. 6B, each of the plurality of ribs 16 is formed to have a length of about ⅔ of the length of each of the spokes 15.

On the other hand, connecting portions 161 and 162 connecting opposite side surfaces of one end of each of the plurality of ribs 16 and the outer surface of the inner ring 13 may be formed in a curved surface having a certain curvature. At this time, the two connecting portions 161 and 162 may be formed to have the same curvature radius as the connecting portions 153 and 154 connecting the spoke 15 and the inner ring 13 facing each other. For example, a curvature radius of the fifth connecting portion 161 facing the third connecting portion 153 of the spoke 15 may be formed to be the same as the curvature radius of the third connecting portion 153, and a curvature radius of the sixth connecting portion 162 facing the fourth connecting portion 154 of the spoke 15 may be formed to be the same as the curvature radius of the fourth connecting portion 154.

Each of the plurality of independent spaces 17 may be provided with a supporting piece 18 for supporting the rib 16. In detail, the supporting piece 18 may be formed between a side surface of the rib 16 and an adjacent spoke 15. The supporting piece 18 is formed in a flat plate shape, and extends from the side surface of the rib 16 to the adjacent spoke 15. In other words, the supporting piece 18 may be formed in a shape to block the space between the rib 16 and spoke 15. As illustrated in FIGS. 6A, 6B, and 6C, in the embodiment, two supporting pieces 18 are provided in opposite sides of the rib 16 formed in the independent space 17. In other words, the supporting pieces 18 are formed to extend from the opposite side surfaces of the rib 16 to the two adjacent spokes 15. Accordingly, the rib 16 is supported by the two supporting pieces 18-1 and 18-2. When the plurality of ribs 16 provided in the plurality of independent spaces 17 are formed to be supported by the two supporting pieces 18-1 and 18-2 as described above, the supporting piece 18 is formed in a circular shape centered on the center C of the inner ring 13 as illustrated in FIG. 6A.

The supporting piece 18 may be formed to have a thickness t2 thinner than the thickness t1 of each of the plurality of ribs 16. Also, the length L3 of the supporting piece 18 may be formed to be shorter than the length L2 of the rib 16. For example, the supporting piece 18 may be formed to have a length of about ⅔ of the length L2 of the rib 16. The supporting piece 18 may improve the function of the rib 16 of inhibiting the outer ring 11 from moving toward the inner ring 13.

In the above description, the rib 16 is supported by two supporting piece 18 provided in the opposite side surfaces of the rib 16. However, the rib 16 may be supported by a single supporting piece 18 provided in the one side surface of the rib 16.

Also, the plurality of spokes 15 and the plurality of ribs 16 form the plurality of independent spaces 17 between the inner ring 13 and the outer ring 11. In detail, the plurality of independent spaces 17 are formed to penetrate the front surface and the rear surface of the wheel 10 as illustrated in FIG. 5 so that outside air can pass through the plurality of independent spaces 17 of the wheel 10. The shape of the plurality of independent spaces 17 is determined by the arrangement of the plurality of spokes 15 and the plurality of ribs 16, and may be deformed by the deformation of the spokes 15. In detail, when a portion of the outer ring 11 to which the force is applied is deformed so that at least one spoke 15 supporting the corresponding portion is deformed along with the outer ring 11, the shape of the plurality of independent spaces 17 is also deformed. At this time, the rib 16 and the supporting piece 18 corresponding to the deformed portion of the outer ring 11 and the spoke 15 suppress the deformation of the outer ring 11 and the spoke 15.

For example, when the wheel 10 according to an embodiment of the disclosure overpasses an obstacle, a contact portion of the outer ring 11 in contact with the obstacle is deformed corresponding to the shape of the obstacle so that the contact portion between the outer ring 11 and the obstacle is widened as possible. At this time, some spokes 15 supporting the contact portion of the outer ring 11 and some independent spaces 17 around the contact portion are deformed so as to absorb the deformation of the contact portion of the outer ring 11, and some ribs 16 and supporting pieces 18 formed between the corresponding spokes 15 may suppress the deformation of the outer ring 11.

The outer ring 11, the inner ring 13, the plurality of spokes 15, the plurality of ribs, and the plurality of supporting pieces 18 of the wheel 10 with spokes according to an embodiment of the disclosure as described above may be formed of an elastic material, for example, an injection rubber, a vulcanized rubber, etc.

The injection rubber may be a thermoplastic elastic material, and may include thermoplastic poly urethane (TPU), thermoplastic elastomer (TPE), thermoplastic vulcanizate (TPV), etc. The vulcanized rubber is natural rubbers and synthetic rubbers, and may include natural rubber (NR), ethylene propylene diene monomer (EPDM), butadiene rubber (BR), styrene butadiene rubber (SBR), nitrile butadiene rubber (NBR), hydrogenated nitrile butadiene rubber (HNBR), polychloroprene rubber (CR), isoprene-isobutylene rubber (IIR), etc.

When the above-described wheel 10 is disposed in the robot cleaner 300, the two wheels 10 which are disposed parallel to each other may be provided so that the bending direction of the plurality of spokes 15 and the plurality of ribs 16 of each of the two wheels 10 is matched with each other.

Figure 8:
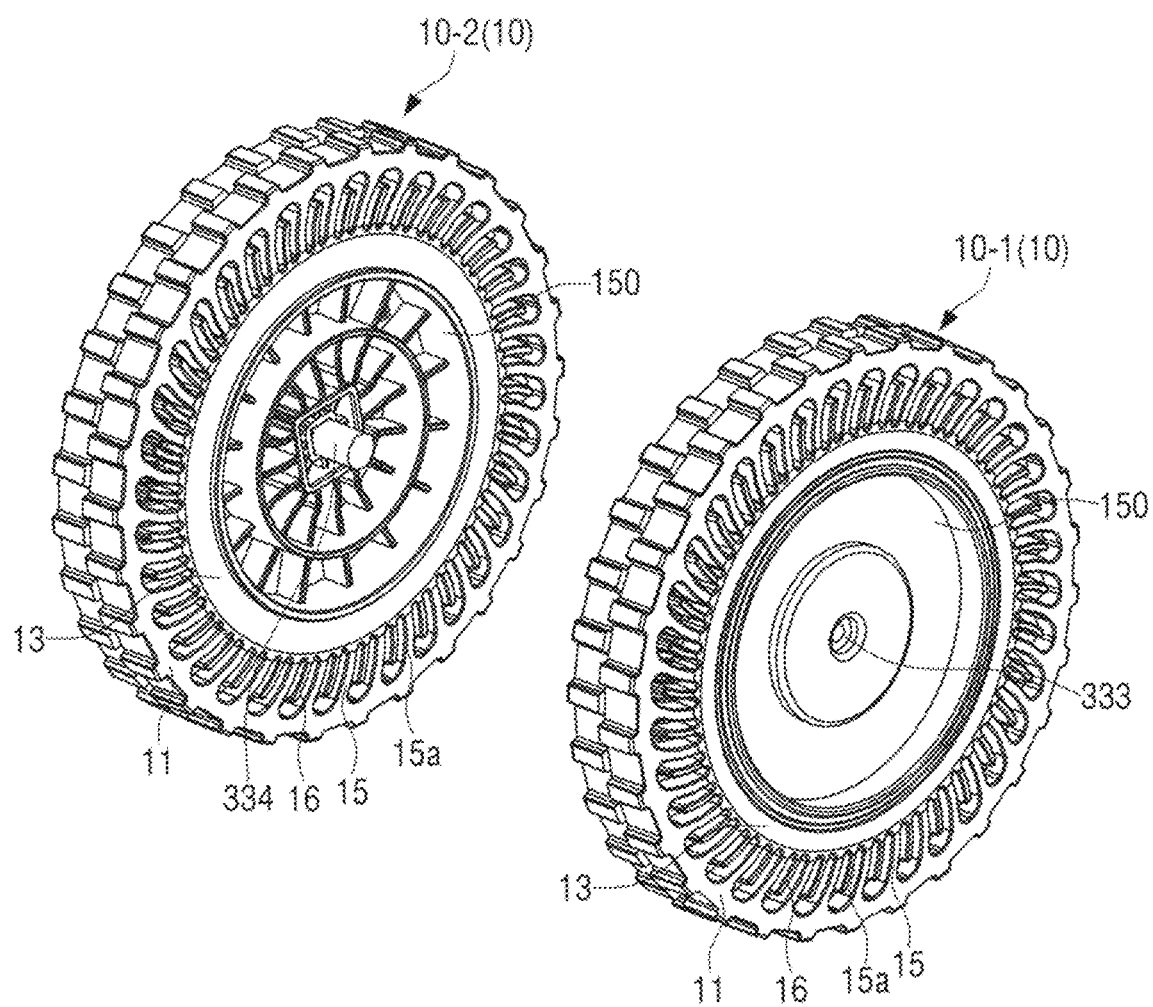
FIG. 8 is a perspective view illustrating the wheels of FIGS. 7A and 7B that are disposed in the robot cleaner.

Hereinafter, an installation method of two wheels will be described with reference to FIGS. 7A, 7B, and 8.

FIG. 7A is a perspective view illustrating a wheel according to a first embodiment of the disclosure that will be disposed in a side of a robot cleaner, and FIG. 7B is a perspective view illustrating a wheel according to a first embodiment of the disclosure that will be disposed in the other side of a robot cleaner. FIG. 8 is a perspective view illustrating the wheels of FIGS. 7A and 7B that are disposed in the robot cleaner. In FIG. 8, for the convenience of illustration, other parts of a drive portion 330 are omitted except for rotational shaft 333 and 334.

Referring to FIGS. 7A and 7B, the hub 150 may be assembled in two forms in the wheel that is used in the robot cleaner 300. One form is that the hub 150 is assembled to the inner ring 13 of the wheel 10 so that the plurality of spokes 15 and the plurality of ribs 16 of the wheel 10 are bent toward the right around the shaft hole 152 of the hub 150 as illustrated in FIG. 7A. Hereinafter, this is referred to as a first wheel 10-1. The other form is that the hub 150 is assembled to the inner ring 13 of the wheel 10 so that the plurality of spokes 15 and the plurality of ribs 16 of the wheel 10 are bent toward the left around the shaft hole 152 of the hub 150 as illustrated in FIG. 7B. Hereinafter, this is referred to as a second wheel 10-2. After the hub 150 is assembled to the wheel 10, the hub 150 of the first wheel 10-1 as illustrated in FIG. 7A is assembled to the rotational shaft 333 of the first drive unit 331, and the hub 150 of the second wheel 10-2 as illustrated in FIG. 7B is assembled to the rotational shaft 334 of the second drive unit 332. Thus, as illustrated in FIG. 8, the bending direction of the plurality of spokes 15 of the first wheel 10-1 is matched with the bending direction of the plurality of spokes 15 of the second wheel 10-2. Also, since the plurality of ribs 16 of the first wheel 10-1 and the second wheel 10-2 are bent in the same direction as the plurality of spokes 15, the bending direction of the plurality of ribs 16 of the first wheel 10-1 is matched with the bending direction of the plurality of ribs 16 of the second wheel 10-2.

At this time, the bending direction of the plurality of spokes 15 of the first and second wheels 10-1 and 10-2 may be determined so that when the spoke 15 is in contact with or adjacent to the surface to be cleaned, a recessed portion 15a of the spoke 15 is directed toward the front surface 311 of the robot cleaner 300. In the case in which the first wheel 10-1 and the second wheel 10-2 are disposed in the robot cleaner 300 as described above, when the robot cleaner 300 is traveling in the forward direction, climbing ability to overpass the obstacle located on the surface to be cleaned may be improved. Here, the front surface of the robot cleaner 300 refers to the reference numeral 311 in FIGS. 2 and 3. The bottom surface 312 adjacent to the front surface 311 of the robot cleaner 300 is provided with the suction port 342. The front side of the robot cleaner 300 refers to a space in front of the front surface 311 of the robot cleaner 300. Accordingly, the robot cleaner 300 is traveling in the forward direction refers to that the robot cleaner 300 moves in a state in which the front surface 311 of the robot cleaner 300 is the front.

In the case in which the installation direction of the first and second wheels 10-1 and 10-2 is opposed to the direction of the above-described embodiment, in detail, in the case in which when the spoke 15 is in contact with or adjacent to the surface to be cleaned, the recessed portion 15a of the spoke 15 is directed toward the rear surface of the robot cleaner 300, when the robot cleaner 300 is traveling in the forward direction, the climbing ability to overpass the obstacle on the surface to be cleaned is decreased.

Also, when the bending direction of the plurality of spokes 15 of the first wheel 10-1 is opposite to the bending direction of the plurality of spokes 15 of the second wheel 10-2, the climbing ability of the robot cleaner 300 may be lowered.

Figure 9:
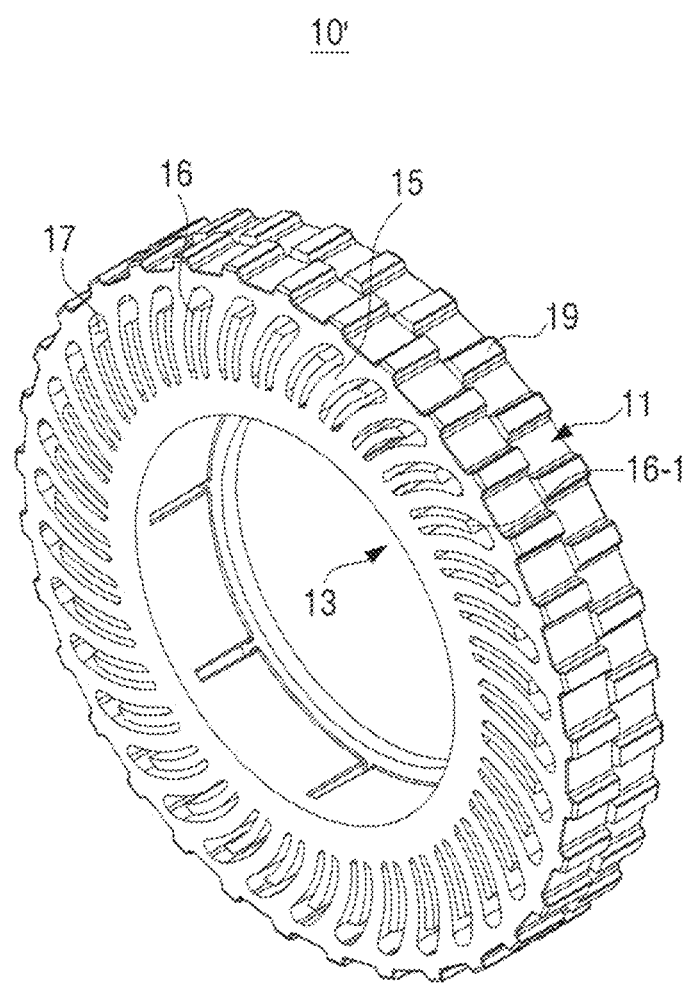
FIG. 9 is a perspective view illustrating a first variation of the wheel according to the first embodiment of FIG. 5.

FIG. 9 is a perspective view illustrating a first variation of the wheel according to the first embodiment of FIG. 5.

The wheel 10' according to a first variation of the disclosure is the same as the wheel 10 of the above-described first embodiment in that the wheel 10' includes the inner ring 13, the outer ring 11, the plurality of spokes 15, and the plurality of ribs 16, and is different from the wheel 10 of the above-described embodiment in that the supporting pieces 18 are not provided in the plurality of independent spaces 17 defined by the plurality of spokes 15 and the plurality of ribs 16.

Referring to FIG. 9, the wheel 10' according to the first variation is different from the wheel 10 of the first embodiment as described above in that there is no two supporting pieces 18 for supporting the opposite side surfaces of the rib 16.

Figure 10:
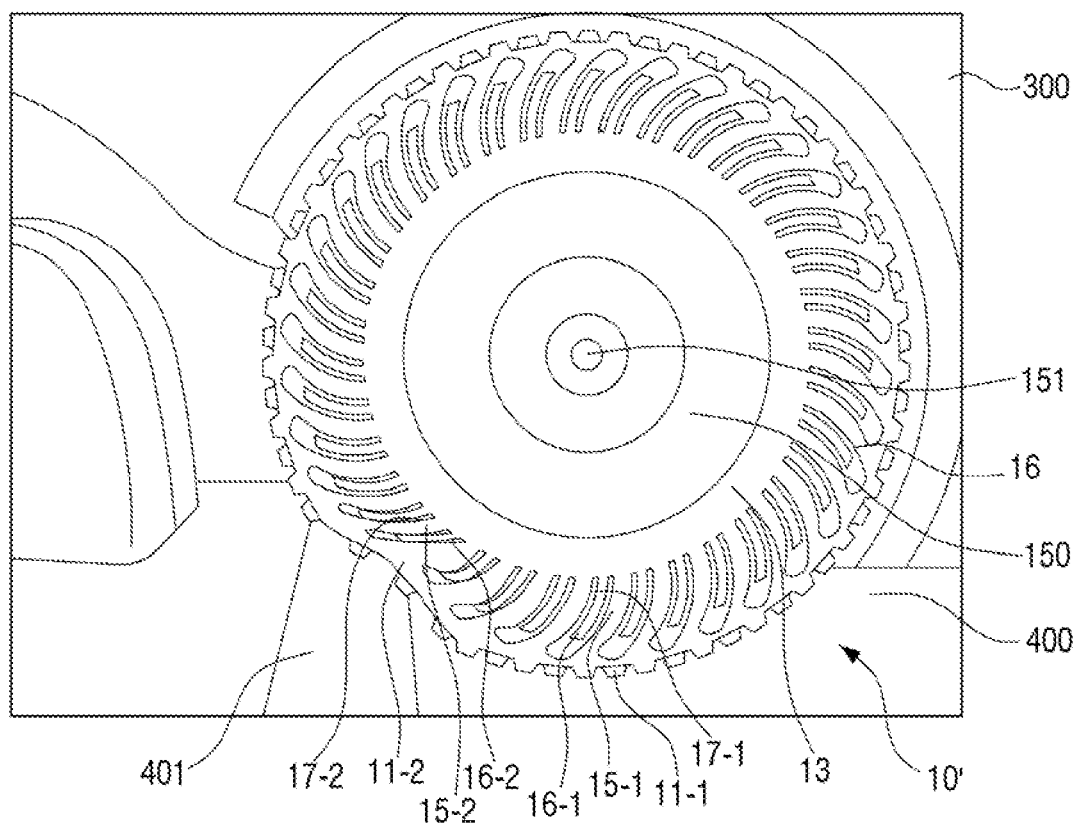
FIG. 10 is an image illustrating when a wheel with spokes according to an embodiment of the disclosure overpasses an obstacle.

FIG. 10 is an image illustrating when a wheel with spokes according to an embodiment of the disclosure overpasses an obstacle.

Referring to FIG. 10, the wheel 10' with spokes according to an embodiment of the disclosure is rotatably disposed in the bottom surface 312 (see FIG. 3) of the robot cleaner 300.

The wheel 10' according to an embodiment of the disclosure allows the robot cleaner 300 to move on the surface to be cleaned 400 while supporting the weight of the robot cleaner 300. When robot cleaner 300 moves on the surface to be cleaned 400, in order to support the weight of the robot cleaner 300, the outer ring 11 of the wheel 10' is slightly deformed so that a certain area of the outer ring 11 is in contact with the surface to be cleaned 400. At this time, at least one spoke 15-1 supporting the portion 11-1 of the outer ring 11 in contact with the surface to be cleaned 400 is slightly deformed according to deformation of the outer ring 11. Accordingly, some independent spaces 17-1 formed by adjacent spokes 15 are deformed in the shape according to the deformation of the spoke 15-1. At this time, the rib 16-1 provided in the some independent space 17-1 suppresses the deformation of the portion 11-1 of the outer ring 11.

When the robot cleaner 300 meets an obstacle 401 during traveling, the wheel 10' with spokes according to an embodiment of the disclosure may easily overpass the obstacle.

When the wheel 10' according to an embodiment of the disclosure is in contact with the obstacle 401, as illustrated in FIG. 10, a portion 11-2 of the outer ring 11 in contact with the obstacle 401 is deformed depending on the shape of the obstacle 401. At this time, because the outer ring 11 and the spokes 15 are formed of an elastic material and the plurality of independent spaces 17 capable of receiving the deformation of the outer ring 11 and the spokes 15 are formed between the outer ring 11 and the inner ring 13, the outer ring 11 may be easily deformed depending on the shape of the obstacle 401. At this time, the deformation of the portion 11-2 of the outer ring 11 in contact with the obstacle 401 and the spokes 15-2 and independent space 17-2 supporting the portion 11-2 is larger than when the wheel 10' supports the weight of the robot cleaner 300. Also, because some ribs 16-2 corresponding to the deformed portion 11-2 of the outer ring 11 among the plurality of ribs 16 provided between the plurality of spokes 15 suppress the deformation of the outer ring 11, the wheel 10' according to an embodiment of the disclosure may keep the deformation capacity corresponding to the obstacle 401, and may support the weight of the robot cleaner 300. When the outer ring 11 is in contact with the obstacle 401 according to the shape of the obstacle 401 as described above, the contact area between the outer ring 11 and the obstacle 401 is widened so that the wheel 10' may easily overpass the obstacle 401. Accordingly, with the wheel 10' with spokes according to an embodiment of the disclosure, the ability of the robot to overpass the obstacle 401 may be improved.

Figure 11:
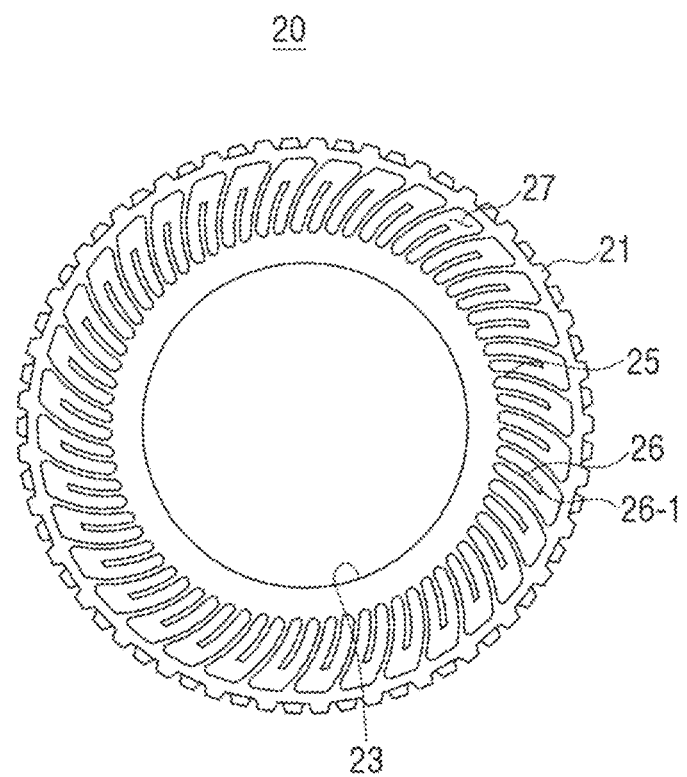
FIG. 11 is a view illustrating a second variation of the wheel according to the first embodiment of FIG. 5.

FIG. 11 is a view illustrating a second variation of the wheel according to the first embodiment of FIG. 5.

The wheel 20 according to a second variation of the disclosure is the same as the wheel 10' of the above-described first variation in that the wheel 20 includes an inner ring 23, an outer ring 11, a plurality of spokes 25, and a plurality of ribs 26 without a plurality of supporting pieces, and is different from the wheel 10' of the above-described first variation in the shape of each of the plurality of independent spaces 27 defined by the plurality of spokes 25 and the plurality of ribs 26 including leading ends 26-1 of the plurality of ribs 26.

Referring to FIG. 11, the wheel 20 according to the second variation is different from the spokes 15 of the wheel 10' of the first variation as described above in that a thickness of the spoke 25 is substantially constant in the lengthwise direction.

Figure 12:
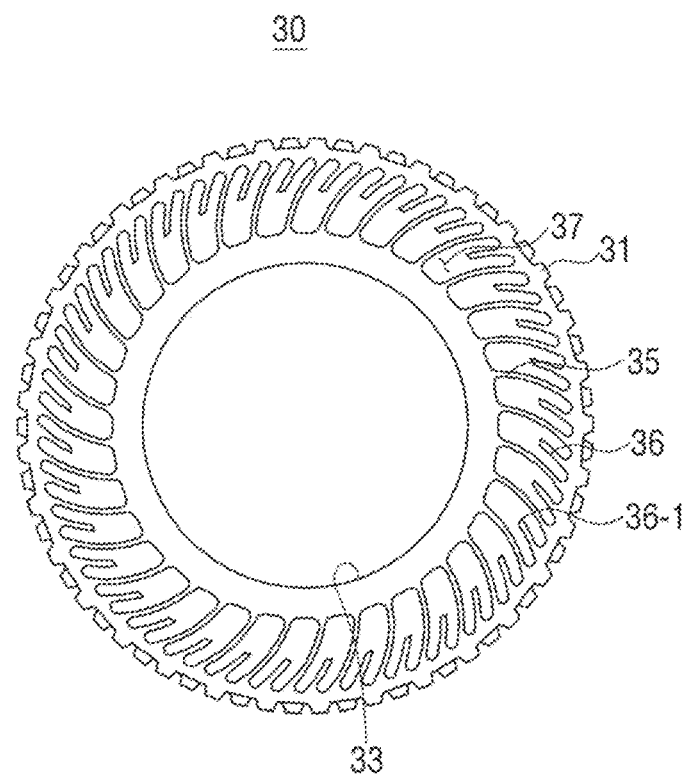
FIG. 12 is a view illustrating a third variation of the wheel according to the first embodiment of FIG. 5.

FIG. 12 is a view illustrating a third variation of the wheel according to the first embodiment of FIG. 5.

The wheel 30 according to a third variation of the disclosure is the same as the wheel 10' of the above-described first variation in that the wheel 30 includes an inner ring 33, an outer ring 31, a plurality of spokes 35, and a plurality of ribs 36, and is different from the wheel 10' of the above-described first variation in the installation positions of the plurality of ribs 36.

Referring to FIG. 12, the plurality of ribs 36 project from the inner surface of the outer ring 31 toward the inner ring 33. The plurality of ribs 36 are formed between pluralities of spokes 35. Each of the plurality of ribs 36 is disposed in a middle between two adjacent spokes 35, and the length of the rib 36 is shorter than the length of the spoke 35. In the third variation as illustrated in FIG. 12, a leading end 36-1 of the rib 36 is not connected to the inner ring 33, and the rib 36 is formed in a length of approximately half of the spoke 35. A single independent space 37, that is, a through hole is formed by the outer ring 31, the inner ring 33, and two spokes 35. A single rib 36 is disposed in the independent space 37.

Figure 13:
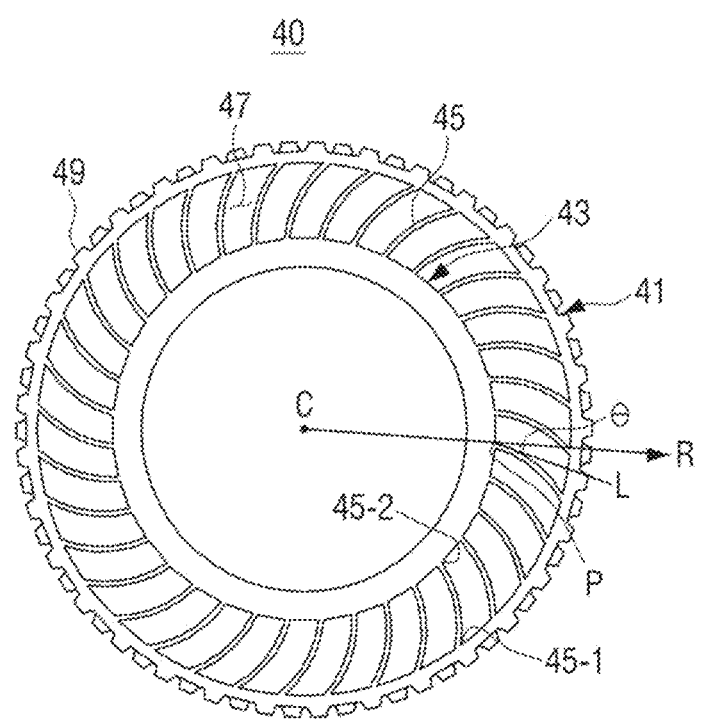
FIG. 13 is a view illustrating a wheel with spokes according to a second embodiment of the disclosure.

FIG. 13 is a view illustrating a wheel with spokes according to a second embodiment of the disclosure.

Referring to FIG. 13, a wheel 40 according to a second embodiment of the disclosure is similar to the wheel 10 of the above-described first embodiment in that the wheel 40 includes an outer ring 41, an inner ring 43, and a plurality of spokes 45, and is different from the wheel 10 of the above-described first embodiment in that the wheel 40 does not include a plurality of ribs and supporting pieces.

In the second embodiment as illustrated in FIG. 13, each of the plurality of spokes 45 is formed to extend obliquely with respect to the radial direction (arrow R) from the inner ring 43 and to be connected to the outer ring 41. In detail, the spoke 45 is formed to be inclined at a predetermined angle θ with respect to an imaginary straight line R passing through the center C of the inner ring 43 and a point P at which the spoke 45 and the inner ring 43 meet each other.

Also, the plurality of spokes 45 are arranged by regular intervals in the circumferential direction of the inner ring 43 between the inner ring 43 and the outer ring 41. The spoke 45 may be formed in an elastic curved plate. Although not illustrated, the spoke 45 may be formed in an elastic inclined flat plate.

A first end 45-1 of the elastic curved plate 45 is connected to the inner surface of the outer ring 41, and the second end 45-2 of the elastic curved plate 45 is connected to the outer surface of the inner ring 43. When the spokes 45 are formed in a curved surface, the inclined angle θ refers to an angle between the imaginary straight line R passing through the center C of the inner ring 43 and the point P at which the elastic curved plate 45 and the inner ring 43 meet each other and a tangent line L of the elastic curved plate 45 passing through the point P at which the elastic curved plate 45 and the inner ring 43 meet each other. An independent space 47, that is, a through hole may be formed by the outer ring 41, the inner ring 43, and two spokes 45. A plurality of protrusions 49 may be provided on the outer surface of the outer ring 41.

Figure 14:
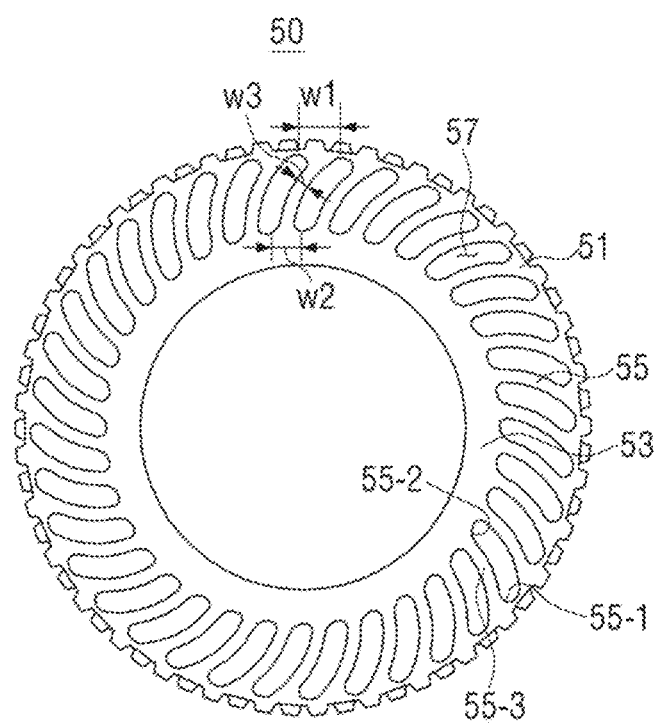
FIG. 14 is a view illustrating a variation of the wheel with spokes according to the second embodiment of FIG. 13.

FIG. 14 is a view illustrating a variation of the wheel with spokes according to the second embodiment of FIG. 13.

The configuration of an inner ring 53 and an outer ring 51 of a wheel 50 according to a variation of the second embodiment of the disclosure is the same as that of the inner ring 43 and the outer ring 41 of the above-described second embodiment, and the shape of spokes 55 is different form the spokes 45 of the above-described embodiment.

Referring to FIG. 14, the spoke 55 is different from the spoke 45 of the above-described second embodiment in that the thickness of the spoke 55 is not uniform. In detail, a thickness w1 of an end 55-1 of the elastic curved plate 55 connected to the outer ring 51 is formed to be thicker than a thickness t3 of a middle portion 55-3 of the elastic curved plate 55. Also, a thickness w2 of the other end 55-2 of the elastic curved plate 55 connected to the outer surface of the inner ring 53 is also formed to be thicker than the thickness t3 of the middle portion 55-3 of the elastic curved plate 55. At this time, the thickness w1 and w2 of the both ends of the elastic curved plate 55 may be formed to be the same as or different from each other.

Also, although not illustrated, the elastic curved plate 55 may be formed so that the thickness of only one end of the both ends of the elastic curved plate 55 is thicker than the thickness t3 of the middle portion 55-3 of the elastic curved plate 55, and the thickness of the other end is the substantially same as the thickness of the middle portion 55-3. For example, the thickness w1 of the end 55-1 of the elastic curved plate 55 connected to the outer ring 51 may be thicker than the thickness w3 of the middle portion 55-3, and the thickness w2 of the other end 55-2 of the elastic curved plate 55 connected to the inner ring 53 may be the substantially same as the thickness t3 of the middle portion 55-3. Contrary, the thickness w2 of the other end 55-2 of the elastic curved plate 55 connected to the inner ring 53 may be thicker than the thickness t3 of the middle portion 55-3, and the thickness w1 of the end 55-1 of the elastic curved plate 55 connected to the outer ring 51 may be the substantially same as the thickness t3 of the middle portion 55-3. An independent space 57, that is, a through hole may be formed by the outer ring 51, the inner ring 53, and two spokes 55.

Hereinafter, a wheel with spokes according to a third embodiment of the disclosure will be described in detail with reference to FIGS. 15A and 15B.

Figure 15A:
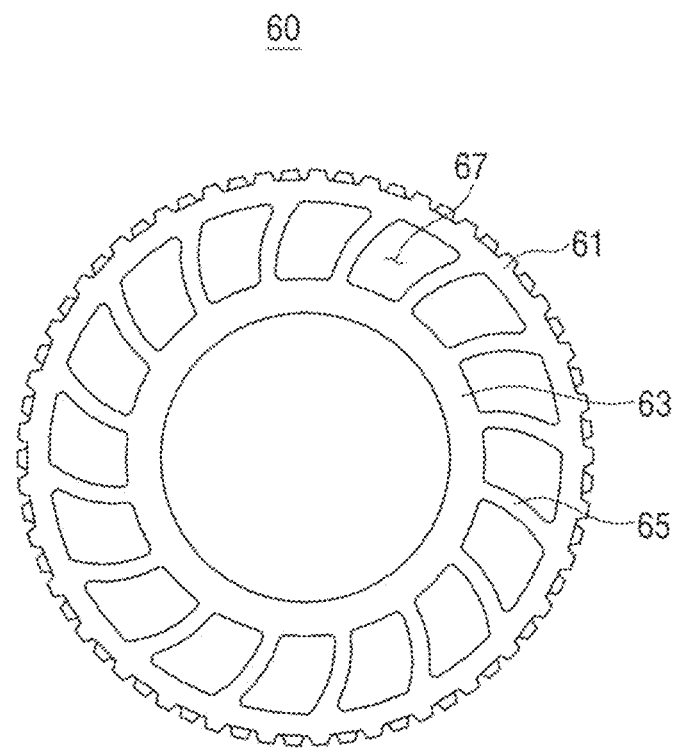
FIG. 15A is a view illustrating a wheel with spokes according to a third embodiment of the disclosure.
Figure 15B:
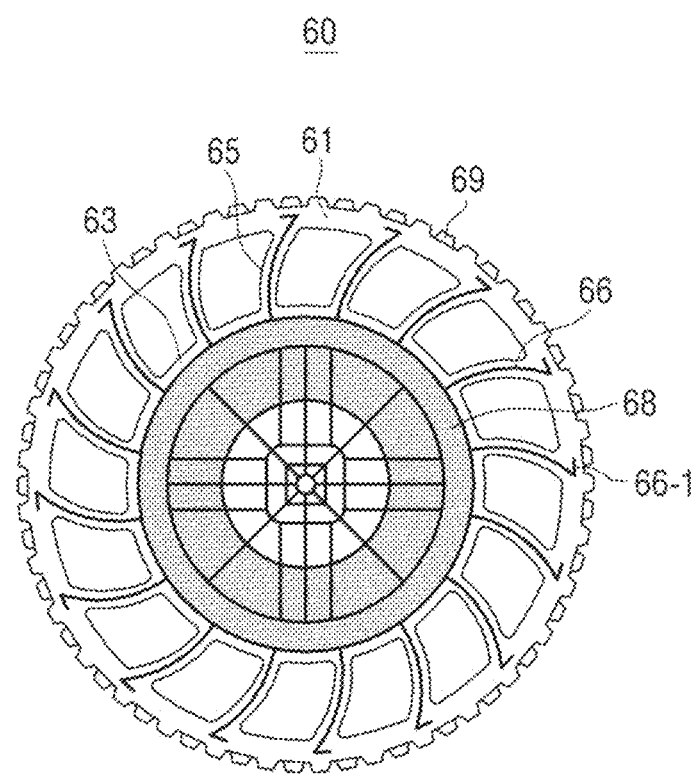
FIG. 15B is a view illustrating a reinforcing member disposed in the wheel with spokes of FIG. 15A.

FIG. 15A is a view illustrating a wheel with spokes according to a third embodiment of the disclosure, and FIG. 15B is a view illustrating reinforcing members disposed in the wheel with spokes of FIG. 15A. FIG. 15B illustrates reinforcing members exposed by cutting an upper part of an outer ring, an inner ring, and a plurality of spokes in FIG. 15A.

Referring to FIGS. 15A and 15B, a wheel 60 with spokes according to a third embodiment of the disclosure an outer ring 61, an inner ring 63, a plurality of spokes 65, and a plurality of reinforcing members 66.

The outer ring 61 is formed in an annular shape or a ring shape, and is formed of an elastic material. The outer surface of the outer ring 61 may be provided with a shape that can prevent sliding when the outer ring 61 is in contact with the surface to be cleaned. For example, a plurality of protrusions 69 may be provided on the outer surface of the outer ring 61. The outer ring 61 is formed so that, when overpassing an obstacle, a contact portion of the outer ring 61 in contact with the obstacle is deformed corresponding to the shape of the obstacle, thereby widening a contact area with the obstacle.

The inner ring 63 is formed in an annular shape or a ring shape, and is positioned concentrically with the outer ring 61 inside the outer ring 61.

The plurality of spokes 65 have a function to absorb deformation of the outer ring 61 by connecting the outer ring 61 and the inner ring 63. When a force is applied to a certain portion of the outer ring 61 and the portion of the outer ring 61 to which the force is applied is deformed, at least one spoke 65 supporting the portion of the outer ring 61 to which the force is applied is deformed to absorb the deformation of the outer ring 61, and then allows the outer ring 61 to be restored in the original state when the force is removed.

The plurality of spokes 65 also form a plurality of through holes 67 between the outer ring 61 and the inner ring 63. Air outside the wheel 60 may pass through the plurality of through holes 67. The shape of the plurality of through holes 67 is determined by the shape and arrangement of the plurality of spokes 65, and allow the spokes 65 to be deformed arbitrarily. For example, when a portion of the outer ring 61 is deformed and the spoke 65 supporting the deformed portion is deformed with the outer ring 61, the shape of each of the plurality of through holes 67 is also deformed by the spokes 65.

The plurality of reinforcing members 66 are disposed in the inside of the plurality of spokes 65. The plurality of reinforcing members 66, as illustrated in FIG. 15B, may be formed to project from a hub 68 disposed inside the inner ring 63. At this time, the plurality of reinforcing members 66 may be formed integrally with the hub 68. The plurality of reinforcing members 66 may be formed of a material elasticity of which is smaller than the elasticity of the spoke 65.

An end of each of the plurality of reinforcing members 66 may be formed to extend to the inside of the outer ring 61. At this time, the one end of the reinforcing member 66 may be provided with a bent portion 66-1. When the one end of the reinforcing members 66 is provided with the bent portion 66-1, the reinforcing members 66 and the outer ring 61 may be more robustly connected. As another example, although not illustrated, the reinforcing members 66 may be formed so that one end of the reinforcing member 66 is extended up to the end of the spoke 65, but is not inserted into the inside of the outer ring 61.

However, the length of the reinforcing member 66 is not limited thereto. The reinforcing member 66 may be formed to be shorter than the length of the spoke 65.

Figure 15C:
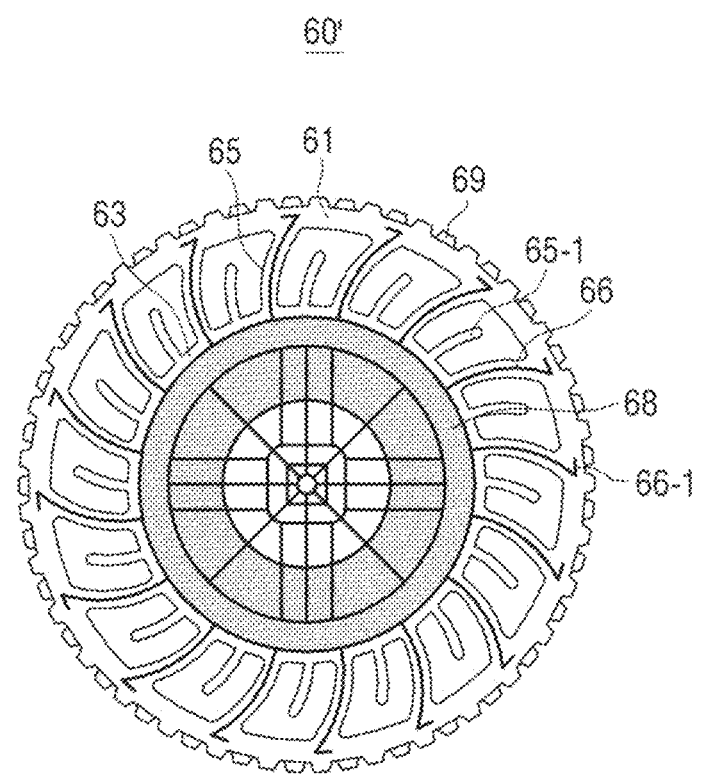
FIG. 15C is a view illustrating a variation of the wheel with spokes of FIG. 15A.

FIG. 15C is a view illustrating a variation of the wheel with spokes of FIG. 15A.

Referring to FIG. 15C, the wheel 60' according to a variation of a third embodiment of the disclosure is the same as the wheel 60 of the above-described third embodiment in that the wheel 60' includes an outer ring 61, an inner ring 63, a plurality of spokes 65, and a plurality of reinforcing members 66, and is different from the wheel 60 of the above-described third embodiment in that a plurality of ribs 65-1 are provided between the plurality of spokes 65. The plurality of reinforcing members may not be provided in the inside of the plurality of ribs 65-1.

Hereinafter, a wheel with spokes according to a fourth embodiment of the disclosure will be described in detail with reference to FIGS. 16A and 16B.

Figure 16A:
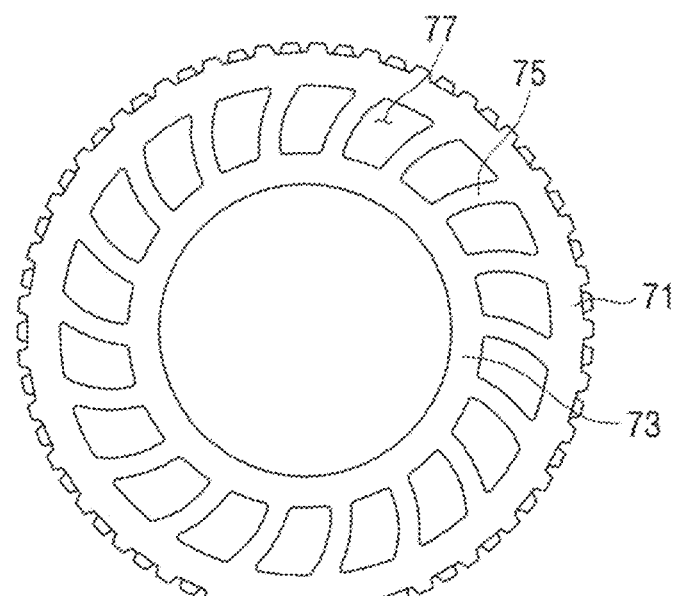
FIG. 16A is a view illustrating a wheel with spokes according to a fourth embodiment of the disclosure.
Figure 16B:
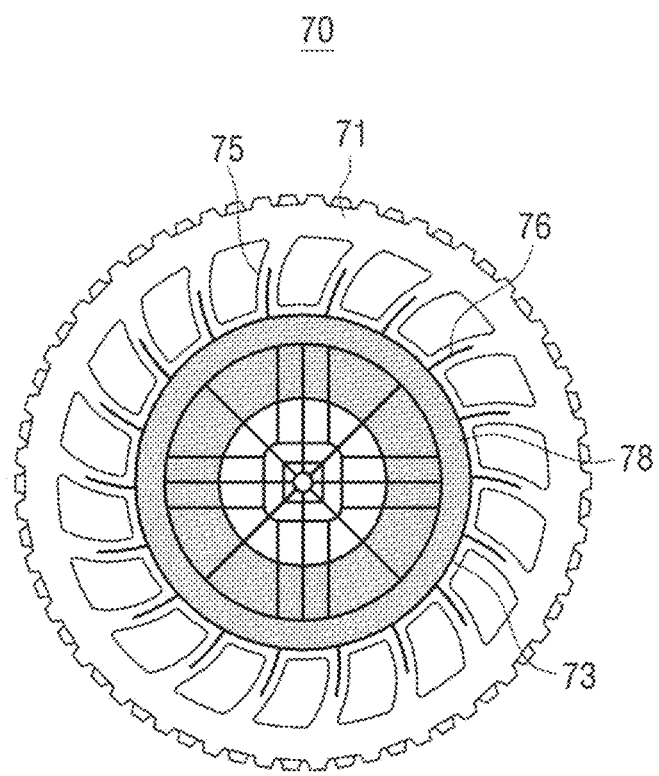
FIG. 16B is a view illustrating a reinforcing member disposed in the wheel with spokes of FIG. 16A.

FIG. 16A is a view illustrating a wheel with spokes according to a fourth embodiment of the disclosure, and FIG. 16B is a view illustrating reinforcing members disposed in the wheel with spokes of FIG. 16A. FIG. 16B illustrates reinforcing members exposed by cutting an upper part of an outer ring, an inner ring, and a plurality of spokes in FIG. 16A.

Referring to FIGS. 16A and 16B, an outer ring 71, an inner ring 73, a plurality of spokes 75, and a plurality of through holes 77 of a wheel 70 with spokes according to a fourth embodiment of the disclosure are the same as those of the wheel 60 with spokes according to the above-described third embodiment.

The plurality of reinforcing members 76 may be formed integrally with a hub 78 provided in the inner ring 73. The length of the reinforcing member 76 may be formed to be shorter than the length of the spoke 75. In other words, one end of each of the plurality of reinforcing members 76 may be not extended up to the outer ring 71. In this embodiment, each of the reinforcing members 76 is extended to approximately the middle of the spoke 75. Also, the plurality of reinforcing members 76 may be formed of a material elasticity of which is smaller than the elasticity of the spoke 75.

Figure 16C:
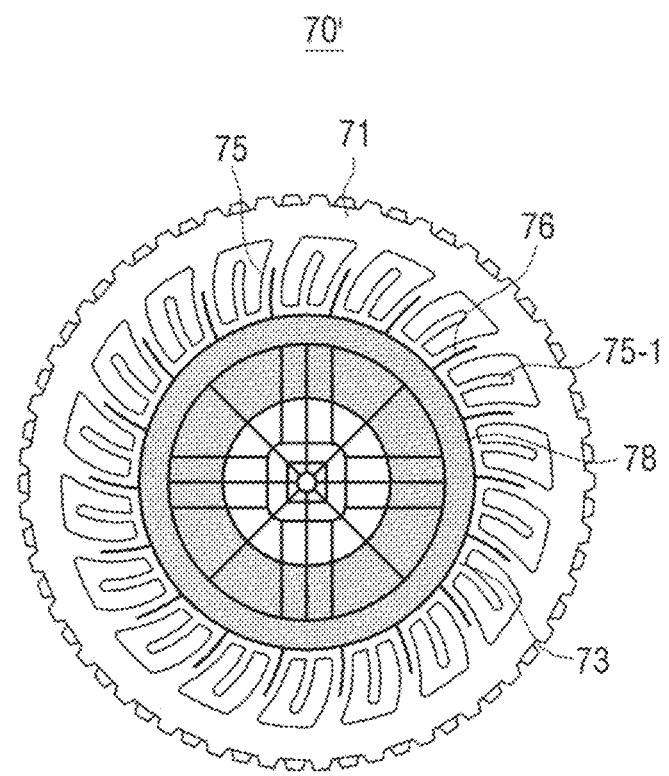
FIG. 16C is a view illustrating a variation of the wheel with spokes of FIG. 16A.

FIG. 16C is a view illustrating a variation of the wheel with spokes of FIG. 16A.

Referring to FIG. 16C, the wheel 70' according to a variation of a fourth embodiment of the disclosure is the same as the wheel 70 of the above-described fourth embodiment in that the wheel 70' includes an outer ring 71, an inner ring 73, a plurality of spokes 75, and a plurality of reinforcing members 76, and is different from the wheel 70 of the above-described fourth embodiment in that a plurality of ribs 75-1 are provided between the plurality of spokes 75. The plurality of reinforcing members 76 may not be provided in the inside of the plurality of ribs 75-1.

Figure 17A:
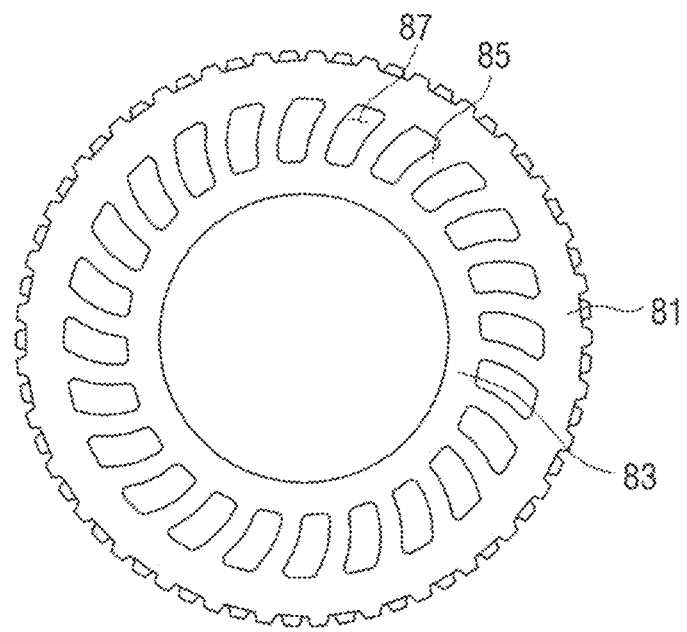
FIG. 17A is a view illustrating a wheel with spokes according to a fifth embodiment of the disclosure.
Figure 17B:
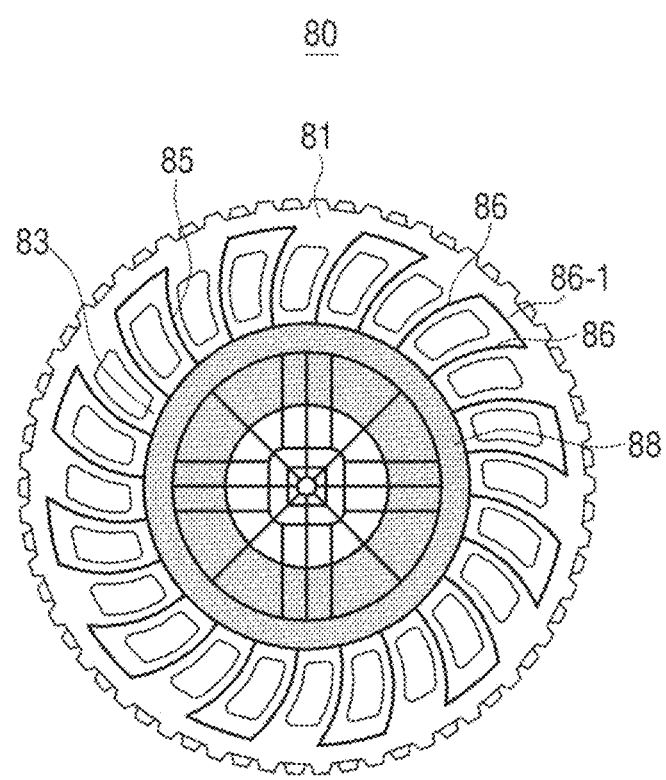
FIG. 17B is a view illustrating a reinforcing member disposed in the wheel with spokes of FIG. 17A.

FIG. 17A is a view illustrating a wheel with spokes according to a fifth embodiment of the disclosure, and FIG. 17B is a view illustrating reinforcing members disposed in the wheel with spokes of FIG. 17A. FIG. 17B illustrates reinforcing members exposed by cutting an upper part of an outer ring, an inner ring, and a plurality of spokes in FIG. 17A.

Referring to FIGS. 17A and 17B, an outer ring 81, an inner ring 83, a plurality of spokes 85, and a plurality of through holes 87 of a wheel 80 with spokes according to a fifth embodiment of the disclosure are the same as those of the wheel 60 with spokes according to a third embodiment.

The plurality of reinforcing members 86 are disposed in the inside of the plurality of spokes 85. The plurality of reinforcing members 86, as illustrated in FIG. 17B, may be formed to project from a hub 88 disposed inside the inner ring 83. At this time, the plurality of reinforcing members 86 may be formed integrally with the hub 88.

An end of each of the plurality of reinforcing members 86 extends to the inside of the outer ring 81, and one end of each of two adjacent reinforcing members 86 among the plurality of reinforcing members 86 is connected to each other by a connecting member 86-1. At this time, the connecting member 86-1 may be formed integrally with the two reinforcing members 86. Accordingly, the two reinforcing members 86 and the single connecting member 86-1, as illustrated in FIG. 17B, form a single framework that is disposed in the inside of two adjacent spokes 85 and the outer ring 81.

The connecting member 86-1 may be formed of a material elasticity of which is smaller than the elasticity of the spoke 85 in the same manner as the reinforcing members 86.

The hub 68, 78, and 88 provided with the reinforcing members 66, 76, and 86 according to the third embodiment, the fourth embodiment, and the fifth embodiment as described above may be formed integrally with the outer ring 61, 71, and 81, the inner ring 63, 73, and 83, and the plurality of spokes 65, 75, and 85 by an insert molding process when the outer ring 61,71, and 81, the inner ring 63, 73, and 83, and the plurality of spokes 65, 75, and 85 are formed of an elastic material such as rubber.

Figure 17C:
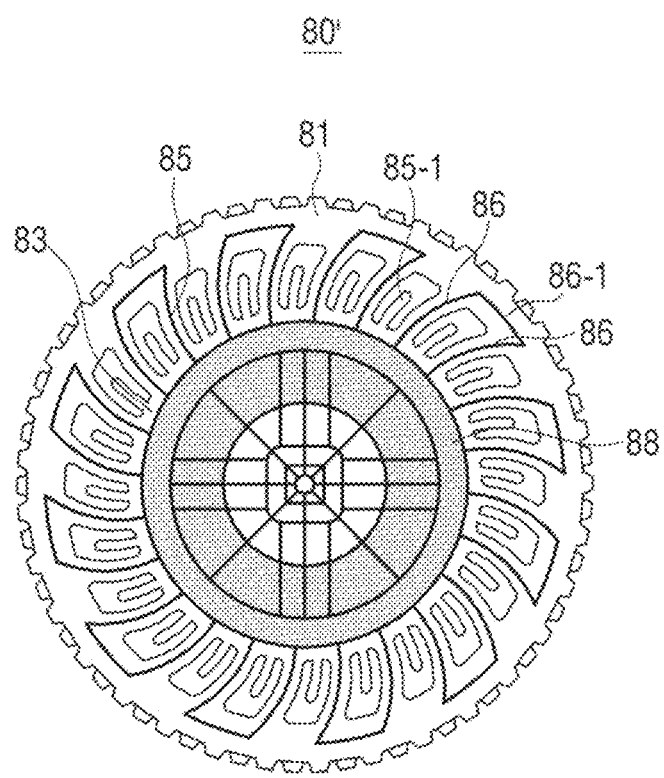
FIG. 17C is a view illustrating a variation of the wheel with spokes of FIG. 17A.

FIG. 17C is a view illustrating a variation of the wheel with spokes of FIG. 17A.

Referring to FIG. 17C, the wheel 80' according to a variation of a fifth embodiment of the disclosure is the same as the wheel 80 of the above-described fifth embodiment in that the wheel 80' includes an outer ring 81, an inner ring 83, a plurality of spokes 85, and a plurality of reinforcing members 86, and is different from the wheel 80 of the above-described fifth embodiment in that a plurality of ribs 85-1 are provided between the plurality of spokes 85. The plurality of reinforcing members 86 may not be provided in the inside of the plurality of ribs 85-1.

Figure 18:
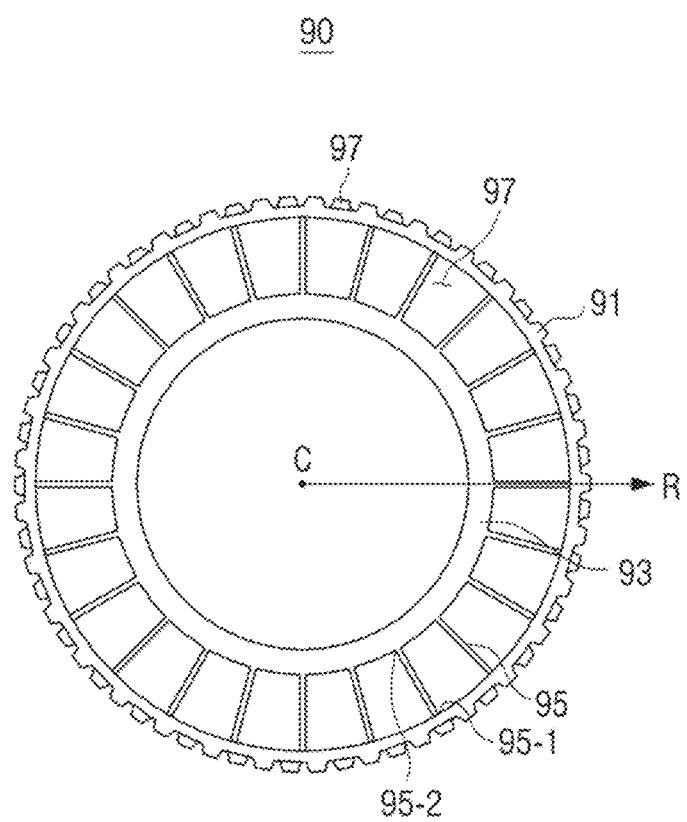
FIG. 18 is a view illustrating a wheel with spokes according to a sixth embodiment of the disclosure.
Figure 19:
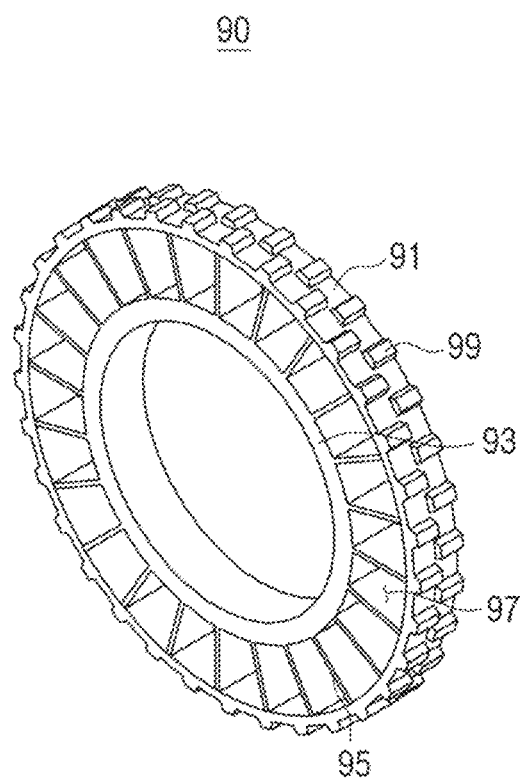
FIG. 19 is a perspective view illustrating the wheel with spokes of FIG. 18.

FIG. 18 is a view illustrating a wheel with spokes according to a sixth embodiment of the disclosure. FIG. 19 is a perspective view illustrating the wheel with spokes of FIG. 18.

Referring to FIGS. 18 and 19, a wheel 90 with spokes according to a sixth embodiment of the disclosure an outer ring 91, an inner ring 93, and a plurality of spokes 95.

The outer ring 91 is formed in an annular shape or a ring shape, and is formed of an elastic material. The outer surface of the outer ring 91 may be provided with a shape that can prevent sliding when the outer ring 91 is in contact with the surface to be cleaned. For example, a plurality of protrusions 99 may be provided on the outer surface of the outer ring 91. The outer ring 91 is formed so that, when overpassing an obstacle, a contact portion of the outer ring 91 in contact with the obstacle is deformed corresponding to the shape of the obstacle, thereby widening a contact area with the obstacle.

The inner ring 93 is formed in an annular shape or a ring shape, and is positioned concentrically with the outer ring 91 inside the outer ring 91.

The inside of the inner ring 93 is provided with a hub 150 as illustrated in FIG. 15. The hub 150 is formed of a rigid body, and is formed in a substantially cylindrical shape. The inner ring 93 is fixed to the hub 150 so that when the hub 150 rotates, the inner ring 93 is not separated from the hub 150.

The plurality of spokes 95 have a function to absorb deformation of the outer ring 91 by connecting the outer ring 91 and the inner ring 93. When a force is applied to a certain portion of the outer ring 91 and the portion of the outer ring 91 to which the force is applied is deformed, at least one spoke 95 supporting the portion of the outer ring 91 to which the force is applied is deformed to absorb the deformation of the outer ring 91, and then allows the outer ring 91 to be restored in the original state when the force is removed.

The plurality of spokes 95 also form a plurality of through holes 97 between the outer ring 91 and the inner ring 93. Air outside the wheel 90 may pass through the plurality of through holes 97. The shape of each of the plurality of through holes 97 is determined by the shape and arrangement of the plurality of spokes 95, and may be deformed arbitrarily by the deformation of the spokes 95. For example, when a portion of the outer ring 91 is deformed so the spoke 95 supporting the deformed portion is deformed with the outer ring 91, the shape of the plurality of through holes 97 is also deformed by the deformation of the spokes 95.

In the embodiment as illustrated in FIGS. 18 and 19, the plurality of spokes 95 extend in the radial direction (direction of arrow R) from the inner ring 93 to be connected to the outer ring 91.

In detail, the spoke is formed in an elastic flat plate that extends in the radial direction from the inner ring 93. One end 95-1 of the elastic flat plate 95 is connected to the inner surface of the outer ring 91, and the other end 95-2 of the elastic flat plate 95 is connected to the outer surface of the inner ring 93. Also, the plurality of spokes 95 are arranged by regular intervals in the circumferential direction of the inner ring 93 between the inner ring 93 and the outer ring 91.

Figure 20:
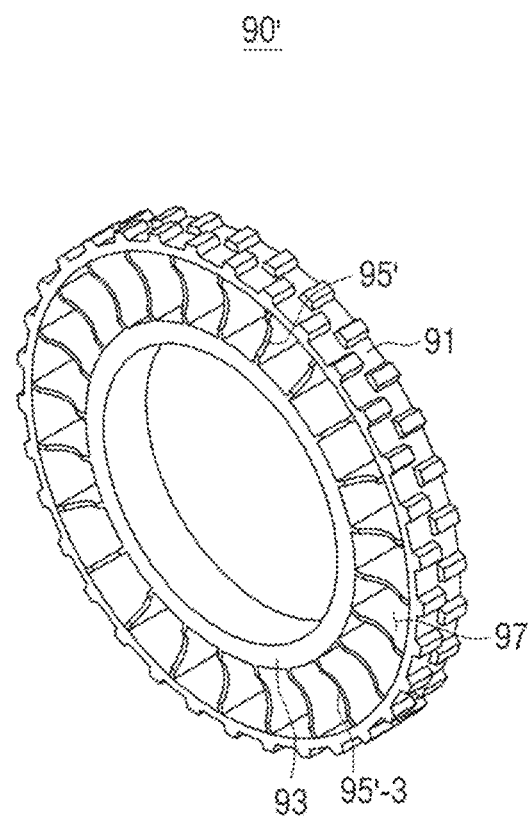
FIG. 20 is a perspective view illustrating a variation of the wheel with spokes according to a sixth embodiment of FIG. 18.

FIG. 20 is a view illustrating a variation of the wheel with spokes according to a sixth embodiment of FIG. 18.

As another example, as illustrated in FIG. 20, the elastic flat plate 95' may be formed a width of an end of the elastic flat plate 95' connected to the outer ring 91 is the substantially same as the width of the other end of the elastic flat plate 95' connected to the inner ring 93, and a width of a middle portion 95'-3 of the elastic flat plate 95' is narrower than the width of the one end. At this time, the elastic flat plate 95' may be formed by cutting the both side surfaces of the elastic flat plate 95 according to the above-described embodiment in a concave curve having a predetermined curvature.

Figure 21:
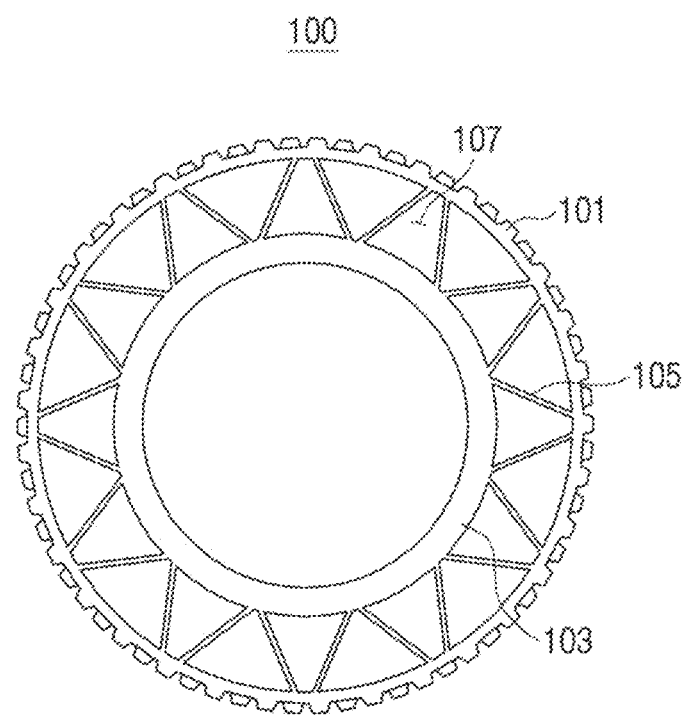
FIG. 21 is a view illustrating a wheel with spokes according to a seventh embodiment of the disclosure.

FIG. 21 is a view illustrating a wheel with spokes according to a seventh embodiment of the disclosure.

Referring to FIG. 21, an outer ring 101 and an inner ring 103 of a wheel 100 with spokes according to a seventh embodiment of the disclosure are the same as those of the wheel 90 with spokes according to the above-described sixth embodiment.

A plurality of spokes 105 that are formed of elastic flat plates connecting the outer ring 101 and the inner ring 103 are similar to the spokes 95 of the wheel 90 according to the above-described sixth embodiment of the disclosure. However, the arrangement of the plurality of spokes 105 is different from that of the plurality of spokes 95 of the wheel 90 according to the sixth embodiment as described above. The plurality of spokes 105 according to the embodiment are arranged so that two adjacent spokes 105 form a substantially isosceles trapezoid with the outer ring 101 and the inner ring 103. The inside of the isosceles trapezoid formed by the two spokes 105, the outer ring 101, and the inner ring 103 forms a through hole 107 through which outside air passes.

As another example, although not illustrated, the plurality of spokes 105 may be arranged so that two adjacent spokes 105 form a substantially triangular shape.

Figure 22:
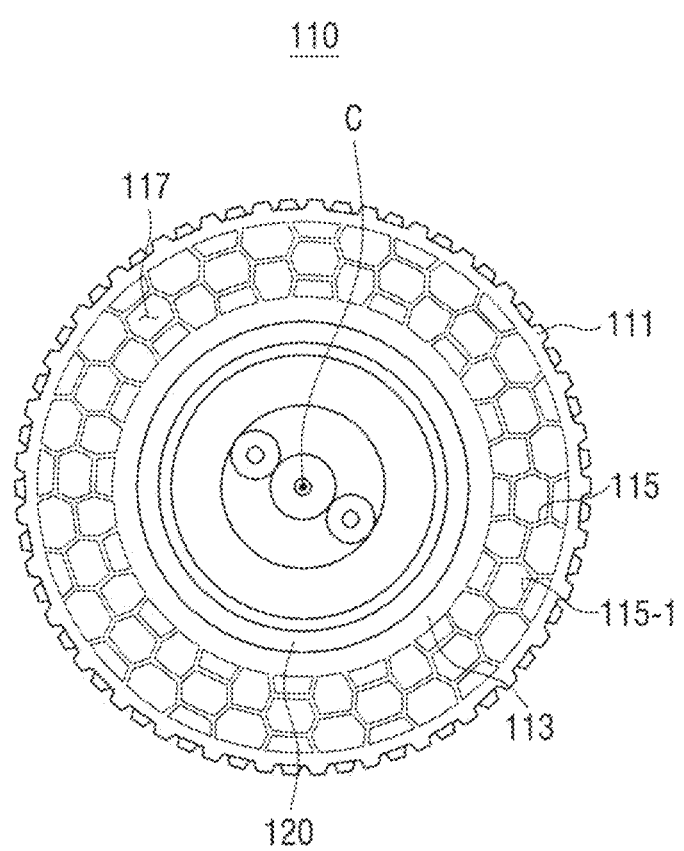
FIG. 22 is a view illustrating a wheel with spokes according to an eighth embodiment of the disclosure.

FIG. 22 is a view illustrating a wheel with spokes according to an eighth embodiment of the disclosure.

Referring to FIG. 22, an outer ring 111 and an inner ring 113 of a wheel 110 with spokes according to an eighth embodiment of the disclosure are the same as those of the wheel 90 with spokes according to the above-described sixth embodiment.

A plurality of spokes 115 that is formed in a honeycomb structure is different from the plurality of spokes 95 of the wheel 90 according to the above-described sixth embodiment.

The honeycomb structure that forms the spokes 115 is formed in the form as diverging from the outer surface of the inner ring 113 towards the outer ring 111 based on the center C of the inner ring 113. Accordingly, a size of a single honeycomb is increased in the radial direction. In other words, the size of a honeycomb adjacent to the outer ring 111 is larger than the size of a honeycomb adjacent to the inner ring 113. Also, the honeycomb structure may be formed so that honeycombs 115-1 of a hexagonal shape which are positioned in the middle in the radial direction between the inner ring 113 and the outer ring 111 are connected like a chain. The inner space of the single honeycomb 115-1 forms a through hole 117 through which outside air passes.

In the above description, a wheel with spokes according to one or more embodiments of the disclosure is applied to a robot cleaner; however, the disclosure is not limited thereto. A wheel with spokes according to one or more embodiments of the disclosure may be applied to mobile robots for other purposes in addition to the robot cleaner.

Also, a wheel with spoke according to one or more embodiments of the disclosure may be applied to moving toys such as toy cars or the like in addition to the mobile robots.

While the embodiments of the disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

Although example embodiments have been shown and described, it would be appreciated by those skilled in the art that changes may be made to these embodiments without departing from the principles and spirit of the disclosure, the scope of which is defined in the claims and their equivalents.

What is claimed is:

1. A robot cleaner, comprising:
a wheel, comprising:
an outer ring contactable with a surface to be cleaned by the robot cleaner,
an inner ring disposed inside the outer ring and configured to receive a driving force,
a plurality of spokes connecting the outer ring with the inner ring,
a plurality of through holes through which air passes, provided between the plurality of spokes, respectively, and
a plurality of ribs disposed in a portion of the plurality of through holes, respectively, the plurality of ribs having a length that is less than a length of the plurality of spokes,
wherein when the outer ring is moved toward the inner ring, the plurality of ribs are configured to limit movement of the outer ring.

2. The robot cleaner of claim 1, further comprising:
a plurality of supporting pieces disposed in another portion of the plurality of through holes, respectively, and configured to support the plurality of ribs with respect to adjacent spokes among the plurality of spokes.

3. The robot cleaner of claim 2, wherein a thickness of the supporting piece is less than a thickness of a respective rib among the plurality of ribs, and a length of the supporting piece is less than a length of the respective rib among the plurality of ribs.

4. The robot cleaner of claim 1, wherein the plurality of ribs are connected at one end to the inner ring.

5. The robot cleaner of claim 1, wherein a width of each of the plurality of ribs is less than a width of each of the plurality of spokes.

6. The robot cleaner of claim 1, wherein each of the plurality of spokes has a curved surface bent in a circumferential direction of the inner ring.

7. The robot cleaner of claim 6, wherein each of the plurality of ribs has a curved surface bent in a same direction as the plurality of spokes.

8. The robot cleaner of claim 7, wherein
the wheel comprises a first wheel and a second wheel that are disposed parallel to each other, and
a plurality of spokes of the first wheel are bent in a same direction as a plurality of spokes of the second wheel.

9. The robot cleaner of claim 8, wherein the first wheel and the second wheel are disposed so that when each of the plurality of spokes of the first wheel and the second wheel is adjacent to the surface to be cleaned, a recessed portion of the each of the plurality of spokes of the first wheel and the second wheel is directed toward a front surface of the robot cleaner.

10. The robot cleaner of claim 1, wherein each of the plurality of ribs is spaced apart from two adjacent spokes among the plurality of spokes.

11. The robot cleaner of claim 10, wherein each of the plurality of ribs is centrally disposed between the two adjacent spokes among the plurality of spokes.

12. The robot cleaner of claim 1, wherein at least one of a width of one end of at least one spoke among the plurality of spokes connected to the inner ring and a width of an opposite end of the at least one spoke connected to an inner surface of the outer ring is greater than a width of a middle portion of the at least one spoke.

13. The robot cleaner of claim 1, wherein the inner ring is fixed to a hub having a rigid body.

14. The robot cleaner of claim 1, wherein an outer surface of the outer ring is includes a plurality of protrusions.

15. A robot cleaner, comprising:
a wheel, comprising:
an outer ring contactable with a surface to be cleaned by the robot cleaner,
an inner ring disposed inside the outer ring and configured to receive a driving force,
a plurality of spokes connecting the outer ring with the inner ring,
a plurality of through holes through which air passes, provided between the plurality of spokes, respectively, and
a plurality of ribs disposed in a portion of the plurality of through holes, respectively, and configured to limit movement of the outer ring when the outer ring is moved toward the inner ring.

16. The robot cleaner of claim 15, wherein
the plurality of ribs are connected at one end to the inner ring, and
a length of each of the plurality of ribs is less than a length of each of the plurality of spokes.

17. The robot cleaner of claim 16, wherein each of the plurality of spokes and each of the plurality of ribs have a curved surface bent in a circumferential direction of the inner ring.

18. The robot cleaner of claim 17, further comprising:
a plurality of supporting pieces disposed in another portion of the plurality of through holes, respectively, and configured to support the plurality of ribs with respect to adjacent spokes among the plurality of spokes.

19. A robot cleaner, comprising:
a main body;
a cleaning device disposed in the main body and configured to suck material from a surface to be cleaned;
at least one drive device disposed in the main body and configured to allow movement of the robot cleaner; and
at least one wheel rotated by the at least one drive device, the at least one wheel comprising:
an outer ring,
an inner ring disposed concentrically inside the outer ring and configured to receive a driving force from the at least one drive unit,
a plurality of spokes connecting the outer ring with the inner ring,
a plurality of through holes through which air passes, provided between adjacent spokes among the plurality of spokes, respectively, and
a plurality of ribs protruding from one of the inner ring and the outer ring into the plurality of through holes, respectively, and toward the other one of the inner ring and the outer ring, the plurality of ribs being spaced apart from the other one of the inner ring and the outer ring such that the plurality of through holes are substantially u-shaped, wherein when the outer ring is moved toward the inner ring, the plurality of ribs are configured to limit movement of the outer ring.

* * * * *

UNITED STATES PATENT AND TRADEMARK OFFICE
CERTIFICATE OF CORRECTION

PATENT NO. : 10,500,894 B2
APPLICATION NO. : 15/363292
DATED : December 10, 2019
INVENTOR(S) : Chan-young Park et al.

Page 1 of 1

It is certified that error appears in the above-identified patent and that said Letters Patent is hereby corrected as shown below:

In the Claims

Column 20, Line 13, Claim 14, delete "is includes" and insert -- includes --, therefor.

Signed and Sealed this
Eighteenth Day of February, 2020

Andrei Iancu
*Director of the United States Patent and Trademark Office*